United States Patent
Kishigami et al.

(10) Patent No.: US 9,124,913 B2
(45) Date of Patent: *Sep. 1, 2015

(54) WIRELESS COMMUNICATION DEVICE AND WIRELESS COMMUNICATION METHOD

(75) Inventors: Takaaki Kishigami, Tokyo (JP); Daichi Imamura, Kanagawa (JP); Isamu Yoshii, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 312 days.

This patent is subject to a terminal disclaimer.

(21) Appl. No.: 13/635,513

(22) PCT Filed: Mar. 8, 2011

(86) PCT No.: PCT/JP2011/001363
§ 371 (c)(1),
(2), (4) Date: Sep. 17, 2012

(87) PCT Pub. No.: WO2011/125286
PCT Pub. Date: Oct. 13, 2011

(65) Prior Publication Data
US 2013/0016770 A1    Jan. 17, 2013

(30) Foreign Application Priority Data
Apr. 2, 2010    (JP) .................. 2010-086226

(51) Int. Cl.
*H04N 7/12* (2006.01)
*H04N 11/02* (2006.01)
(Continued)

(52) U.S. Cl.
CPC ......... *H04N 21/2662* (2013.01); *H04N 19/114* (2014.11); *H04N 19/152* (2014.11); *H04N 19/164* (2014.11); *H04N 21/44209* (2013.01); *H04N 21/6582* (2013.01)

(58) Field of Classification Search
CPC .......... H04N 21/2662; H04N 21/6582; H04N 21/44209; H04N 19/00054; H04N 19/00193; H04N 19/00236
USPC ....................... 375/240.01, 240.02
See application file for complete search history.

(56) References Cited

U.S. PATENT DOCUMENTS

| | | | |
|---|---|---|---|
| 2001/0014123 A1* | 8/2001 | Strasman et al. | 375/240.13 |
| 2002/0053053 A1 | 5/2002 | Nagai et al. | |

(Continued)

FOREIGN PATENT DOCUMENTS

| | | |
|---|---|---|
| JP | 2002-204278 A | 7/2002 |
| JP | 2005-6288 A | 1/2005 |

(Continued)

OTHER PUBLICATIONS

International Search Report for PCT/JP2011/001363 dated Jun. 14, 2011.

(Continued)

*Primary Examiner* — Hee-Yong Kim
(74) *Attorney, Agent, or Firm* — Pearne & Gordon LLP

(57) ABSTRACT

As a parameter control unit that controls video encoding parameters regarding video encoding in a video encoding unit and transmission channel parameters regarding error correction coding and modulation in a channel coding/modulation unit so as to be linked to each other, a cross layer rate control unit is provided. The cross layer rate control unit performs variable control of the GOP size according to propagation changes by reducing the GOP size when the amount of change in the predicted value of the PHY transmission rate is larger than a determined amount of change and increasing the GOP size when the amount of change in the predicted value of the PHY transmission rate is equal to or less than the determined amount of change.

7 Claims, 25 Drawing Sheets

(51) Int. Cl.
*H04N 11/04* (2006.01)
*H04N 21/2662* (2011.01)
*H04N 21/442* (2011.01)
*H04N 21/658* (2011.01)
*H04N 19/114* (2014.01)
*H04N 19/152* (2014.01)
*H04N 19/164* (2014.01)

(56) References Cited

U.S. PATENT DOCUMENTS

2006/0104370 A1  5/2006  Yamanaka et al.
2006/0258291 A1  11/2006  Nakata et al.
2007/0153916 A1  7/2007  Demircin et al.

FOREIGN PATENT DOCUMENTS

JP  2006-157889 A  6/2006
JP  2007-184913 A  7/2007
WO  2007/114107 A1  10/2007

OTHER PUBLICATIONS

MPEG Workshop data, ISO/IEC JTC1/SC29/WG11, MPEG09/N11225, "Draft Modern Media Transport (MMT) Context and Objectives", Jan. 2010, Kyoto, Japan.

IEEE 802.16 WG letter, C80216-10/0007, Intel Corporation, Jan. 2010.

Shiba Okubo et al., "H.264/AVC textbook, revised third edition", Impress R&D.

* cited by examiner

*FIG. 1*

| GOP SIZE | AMOUNT OF VIDEO ENCODING DATA | VIDEO RECEPTION QUALITY (VARIATION FOLLOWABILITY) |
|---|---|---|
| SMALL ⇕ LARGE | INCREASE ⇕ DECREASE | HIGH ⇕ LOW |

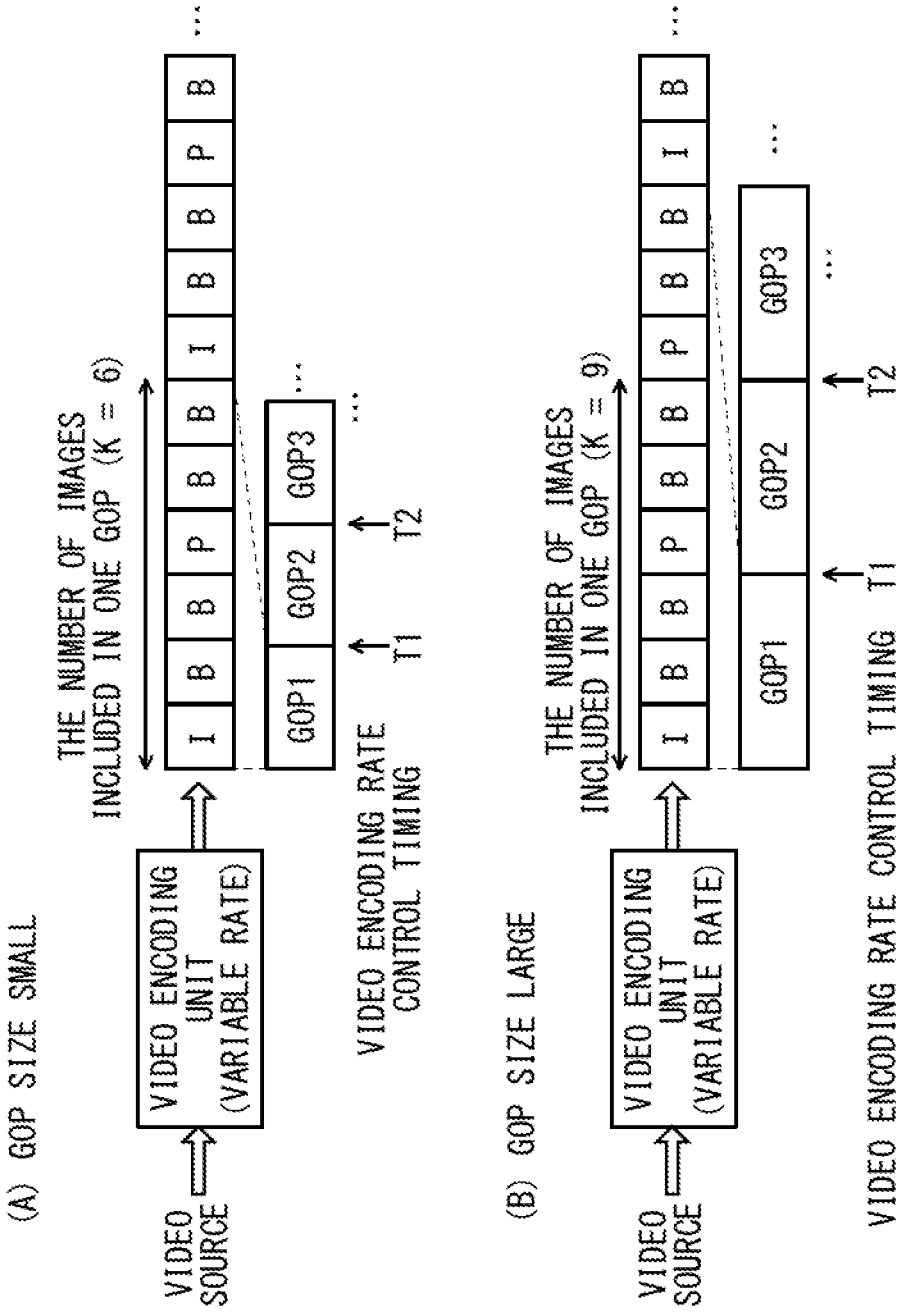

WIRELESS COMMUNICATION DEVICE AND WIRELESS COMMUNICATION METHOD

TECHNICAL FIELD

The present invention relates to a communication device which performs video transmission and in particular, to a wireless communication device and a wireless communication method for performing video transmission using wireless transmission.

BACKGROUND ART

In the IEEE 802.16m (next generation WiMAX (Worldwide Interoperability for Microwave Access)), which is one of the standards of next generation wireless communication technology, or the MPEG (Moving Picture Experts Group), which is one of video data compression methods, cross layer optimization has been considered as new technology for achieving high-efficiency and high-quality video transmission (refer to NPL 1). The cross layer optimization is a method of improving the overall performance by mutual notification of information between different layers and sharing the information between different layers so that protocols of respective layers cooperate with each other. As the cross layer optimization in video transmission, a video encoding process in a layer (video, encoding layer) in which encoding of the video content (including a moving image and a still image) is performed, such as an application layer, is linked to an error correction coding (channel coding) process, which is performed to correct errors occurring at the time of wireless transmission (or cable transmission) of the video content in a physical layer (or a data link layer), for optimization of video transmission efficiency and the transmitted video quality.

FIG. 23 is a view showing a layer structure at the time of transmission of the multimedia content in the related art. In the related art, according to the OSI reference model which defines a hierarchical structure of a network, data is exchanged between layers corresponding to a physical layer, a data link layer, a network layer, a transport layer, and an application layer so that the process at the time of transmission is performed.

The cross layer optimization described above mainly includes the following two approaches (refer to NPL 2). In addition, although a case where wireless transmission is applied as a transmission channel in the physical layer is described below, the transmission means is not limited to this, and similar application may also be made in cable transmission.

(1) Exchange of quality information and parameter information is performed between a layer in which video encoding is performed and a layer in which channel coding is performed. The following two methods may be considered as the method for information exchange between the application layer and the physical layer (wireless layer). The first method is a method of introducing a direct interface between layers over a plurality of layers. The second method is a method of performing information exchange between cross-layer through the network layer (IP layer) in the middle with the addition of header information that can be recognized. FIG. 24 is a view showing a layer structure at the time of transmission of the multimedia content under investigation in the MPEG. The example shown in FIG. 24 corresponds to the first method described above. In this example, an MPEG media transport layer is provided between a multimedia application and a data link layer, and information exchange is performed between the MPEG media transport layer and the data link layer and a physical layer.

(2) A quality evaluation measure (including the quality information of video encoding and the quality information of a transmission section) specific to video transmission is introduced, the transmission rate of a transmission section (wireless transmission section) of a physical layer and the video encoding rate are determined, and an operation to link these is performed. The quality evaluation measure specific to video transmission is disclosed in NPL 2. Here, video distortion D(R) when the transmission rate R of a physical layer and the video encoding rate are variable (under the conditions in which the used wireless resources are fixed) is included in the quality evaluation measure. The video distortion D(R) is related to the video encoding rate. The video distortion D(R) is small when the video encoding rate is high, and the video distortion D(R) is large when the video encoding rate is low. The quality evaluation measure $MCS_{SELECTED}$ including the video distortion D(R) is expressed by the following Expression (1)

[Expression 1]

$$MCS_{SELECTED} = \arg\min_{MCS} D(R) * (1 - PER) + D_{max} * PER \quad (1)$$

On the basis of this quality evaluation measure, the transmission rate and the video encoding rate of the transmission section of the physical layer are selected. In this manner, not only is the efficiency of video transmission increased, but also the effect of maintaining the video quality satisfactorily is obtained.

CITATION LIST

Patent Literature

[NPL 1] MPEG Workshop data, ISO/IEC JTC1/SC29/WG11, MPEG09/N11225, "Draft Modern Media Transport (MMT) Context and Objectives", January 2010, Kyoto, Japan

[NPL 2] IEEE 802.16 WG letter, C80216-10/0007, Intel Corporation, January 2010

[NPL 3] Shiba Okubo et al., "H.264/AVC textbook, revised third edition", Impress R&D

SUMMARY OF INVENTION

Technical Problem

In H.264, MPEG2/MPEG4, and the like which are standardized for video encoding, a video encoding process is performed in units of GOP (Group of Pictures) as disclosed in NPL 3. An I picture subjected to coding within frames, a P picture subjected to predictive coding between forward frames, a B picture subjected to predictive coding between bidirectional frames, and header information of these pictures are included in one GOP, and these frames are encoded so as to be associated with each other. Accordingly, when the video encoding rate is variable, timing of a minimum unit of video encoding rate control is a GOP unit. In addition, in each video-encoded frame, the B picture has a highest compression rate, and the compression rate is reduced in the order of P picture and I picture.

FIG. 25 is a view showing an example of encoded video data when the GOP size is different. Hereinafter, the GOP size will be defined and used as the number K of pictures included in the GOP. In FIG. 25, (A) shows an example when the GOP size is small (K=6), and (B) shows an example when the GOP size is large (K=9).

(A) When the GOP Size is Small

The ratio of the number of I pictures in a GOP is large. Accordingly, when other video encoding parameters are the same, the amount of encoded video data increases (compression rate decreases). In this case, depending on the video content, a probability of excessive video quality, such as a video with a small difference between frames, is increased. On the other hand, since the interval of video encoding rate control timing is short, followability when a band change (transmission rate change and propagation change) in a wireless transmission section occurs is increased.

(B) When the GOP Size is Large

The ratio of the number of I pictures in a GOP is small. Accordingly, when other video, encoding parameters are the same, the amount of encoded video data decreases (compression rate increases). In this case, depending on the video content, a probability of degradation of the video quality, such as a video with a large difference between frames, is increased. On the other hand, since the interval of video encoding rate control timing is long, followability when a band change (transmission rate change and propagation change) in a wireless transmission section occurs is reduced.

As described above, the GOP size may affect the video quality. Therefore, depending on the video content, the video quality on the receiving side may be degraded if the GOP size is not appropriately set. In the above-described method disclosed in NPL 2, when controlling the transmission channel parameters (PHY transmission rate and the like) and the video encoding parameters (video encoding rate and the like), the GOP size is not taken into consideration. For this reason, depending on the state of the transmission channel or the like, a desired video quality may not be secured as the video quality on the receiving side.

An object of the invention is to make it possible to further improve the video quality on the receiving side, when controlling the transmission channel parameters and the video encoding parameters so as to be linked to each other in video transmission.

Solution to Problem

A wireless communication device according to the present invention comprises:

a video encoding unit that performs video encoding on video data;

a channel coding/modulation unit that performs error correction coding and modulation on encoded video data after the video encoding;

a signal transmission unit that transmits channel coded video data after the error correction coding and modulation; and a control unit that performs variable control of a GOP (Group of Pictures) size in the video encoding on the basis of the amount of change in a transmission channel parameter corresponding to a predicted value of a transmission rate of a transmission channel through which the channel coded video data is transmitted.

In the wireless communication device, the GOP size may be controlled so as to become smaller than a determined size when the amount of change in the transmission channel parameter is larger than a determined amount of change.

In the wireless communication device, the GOP size may be controlled so as to become larger than the determined size when the amount of change in the transmission channel parameter is equal to or less than the determined amount of change.

In the wireless communication device, the GOP size may be controlled so as to become smaller than a determined size when the transmission channel parameter is larger than a last transmission channel parameter by a determined value or more or smaller than the last transmission channel parameter by the determined value or more, and the GOP size is controlled so as to become equal to or larger than the determined size when the amount of change in the transmission channel parameter is equal to or less than a determined amount of change.

In the wireless communication device, the GOP size may be controlled so as to become smaller than a determined size when the transmission channel parameter is smaller than a last transmission channel parameter by a determined value or more, the GOP size is controlled so as to become larger than the determined size when the transmission channel parameter is larger than the last transmission channel parameter by a determined value or more, and the GOP size is controlled so as to become a normal size when the amount of change in the transmission channel parameter is equal to or less than a determined amount of change.

In the wireless communication device, when the GOP size is controlled so as to become larger than the determined size or controlled so as to become smaller than the determined size, the control unit may reduce a video encoding rate or a frame rate in the video encoding.

In the wireless communication device, the GOP size may be controlled so as to become smaller than a determined size when the amount of change in the transmission channel parameter is larger than a determined amount of change in a decreasing direction, and the GOP size may be controlled so as to become larger than the determined size when the amount of change in the transmission channel parameter is equal to or less than the determined amount of change in the decreasing direction.

In the wireless communication device, when changing the GOP size, the control unit may change the GOP size according to a rate of change in the GOP size.

In the wireless communication device, the transmission channel parameter may be at least one of a PHY transmission rate in a physical layer and an MCS (Modulation and Coding Scheme) indicating an encoding rate and a modulation method at the time of error correction coding and modulation.

A wireless communication method of a wireless communication device which performs transmission of video data according to the present invention, the method comprising:

a step of performing video encoding on the video data;

a step of performing error correction coding and modulation on encoded video data after the video encoding;

a step of transmitting channel coded video data after the error correction coding and modulation; and a step of performing variable control of a GOP (Group of Pictures) size in the video encoding on the basis of the amount of change in a transmission channel parameter corresponding to a predicted value of a transmission rate of a transmission channel through which the channel coded video data is transmitted. When controlling transmission channel parameters and video encoding parameters so as to be linked to each other in video transmission, the video quality on the receiving side is further improved.

In the above-described configuration, when the amount of change in the transmission channel parameters is equal to or larger than a determined value, followability to propagation changes is increased by reducing the GOP size, so that it is possible to suppress degradation of the video quality when followability to propagation changes is not sufficient. When the amount of change in the transmission channel parameters is equal to or less than the determined value, an increase in the amount of encoded video data when the GOP size is reduced can be absorbed by increasing the GOP size. Therefore, when controlling the transmission channel parameters and the video encoding parameters so as to be linked to each other in video transmission, it is possible to improve the video quality on the receiving side under propagation changes.

Advantageous Effects of Invention

According to the present invention, when controlling the transmission channel parameters and the video encoding parameters so as to be linked to each other in video transmission, the video quality on the receiving side can be further improved.

BRIEF DESCRIPTION OF DRAWINGS

FIG. 1 is a view showing the relationship of the amount of encoded video data and the video reception quality (variation followability) with respect to the GOP size.

FIG. 25 is a view showing an example of encoded video data when the GOP size is different.

DESCRIPTION OF EMBODIMENTS

Figure 2:
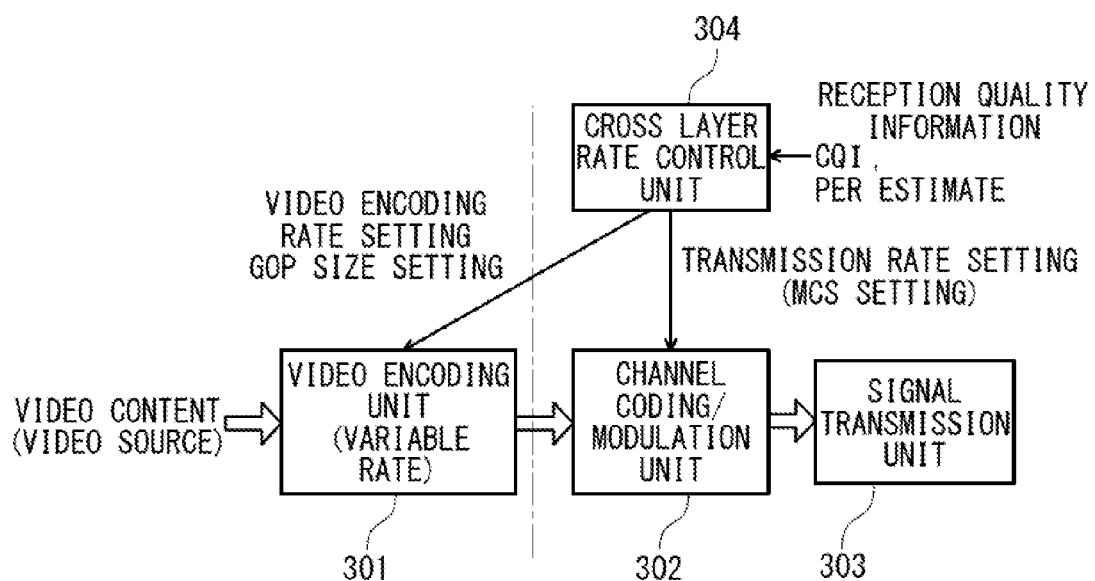
FIG. 2 is a block diagram showing the configuration of a main part of a wireless communication device related to an embodiment of the present invention.

In the present embodiment, as an example of a wireless communication device and a wireless communication method related to the present invention, an example of the configuration of a device that can be applied to the communication standard, such as IEEE 802.16m, is shown. Here, the configuration and operation for performing cross layer optimization, which is to optimize the video quality by linking channel coding and modulation in a physical layer or a data link layer and video encoding in an application layer or the like, will be described in detail.

The present invention notes that the optimal GOP size changes depending on the situation of changes in the transmission rate of the transmission channel. FIG. 1 is a view showing the relationship of the amount of encoded video data and the video reception quality (variation followability) with respect to the GOP size. As the GOP size decreases in a state where other video encoding parameters are fixed, the amount of encoded video data increases (that is, the compression rate becomes low) or the interval of video encoding rate control timing becomes short. Accordingly, followability to band changes in the transmission channel (transmission rate change and propagation change) can be increased. Accordingly, since it is possible to provide the video reception quality according to the situation of the transmission channel, it is possible to improve the video reception quality. On the contrary, as the GOP size increases, the amount of encoded video data decreases (that is, the compression rate becomes high) or the interval of video encoding rate control timing becomes long. Accordingly, followability to band changes in the transmission channel (transmission rate change and propagation change) is degraded. This leads to a decrease in the video reception quality.

In the present embodiment, parameters at the time of video transmission are controlled on the basis of the characteristics of the GOP size with respect to the situation of changes in the transmission rate of the transmission channel. When the transmission rate of the transmission channel changes (or when the amount of change in the transmission rate per unit time exceeds a determined value), followability to propagation changes is increased by reducing the GOP size, so that degradation of the video quality when followability to propagation changes is not sufficient is suppressed. On the other hand, when the transmission rate of the transmission channel does not change (or when the amount of change in the transmission rate per unit time is equal to or less than a determined value), an increase in the amount of encoded video data when the GOP size is small is absorbed on average by reducing the amount of encoded video data (that is, increasing the compression rate).

Accordingly, an effect is obtained in which the video reception quality under propagation changes is improved while suppressing an increase in the amount of encoded video data. In particular, a further effect can be obtained in which, when a plurality of wireless communication devices share the limited resources of the wireless transmission section in performing video transmission, the video reception quality of each wireless communication device can be improved.

FIG. 2 is a block diagram showing the configuration of a main part of a wireless communication device related to the embodiment of the present invention. The wireless communication device of the present embodiment includes a video encoding unit 301, a channel coding/modulation unit 302, a signal transmission unit 303, and a cross layer rate control unit 304. The cross layer rate control unit 304 sets transmission channel parameters according to the transmission rate of the transmission channel and video encoding parameters, such as a video encoding rate (quantization size) and the GOP size, on the basis of CQI (Channel Quality Information) and reception quality information, such as a PER (Packet Error Rate) estimation value. In addition, setting and control of these parameters may be performed separately or performed together partially according to an instruction of the cross layer rate control unit 304 by providing a control unit for each of the setting and the control. As the setting of the transmission channel parameters, setting of the PHY transmission rate in a physical layer, MCS (Modulation and Coding Scheme) setting which determines an encoding rate and a modulation scheme according to the transmission channel situation (propagation quality), or the like is performed. Here, the cross layer rate control unit 304 realizes a function of a parameter control unit.

The video encoding unit 301 performs video encoding of video data (video source) which has the video content including a moving image and a still image as a source. In this case, the video encoding unit 301 can perform video encoding at the variable rate, and performs the encoding process according to the video encoding rate and the GOP size set on the basis of the control of the cross layer rate control unit 304. For the encoded video data, the channel coding/modulation unit 302 performs an error correction coding process of the designated encoding rate and a modulation process based on the designated modulation scheme according to the PHY transmission rate, the MCS, and the like set on the basis of the control of the cross layer rate control unit 304. The signal transmission unit 303 transmits the symbolic data after modulation to the wireless transmission channel as a wireless signal.

Examples of a wireless communication device and a wireless communication method of performing a parameter control operation regarding the video encoding rate, the GOP size, the PHY transmission rate, the MCS, and the like at the time of video transmission are shown in the following embodiments. In each embodiment, an example of the operation when a band change (propagation change) in a wireless transmission section occurs with time due to the influence of fading or the like and accordingly the transmission rate (PHY transmission rate) in a wireless transmission section changes will be described.

First Embodiment

Figure 3:
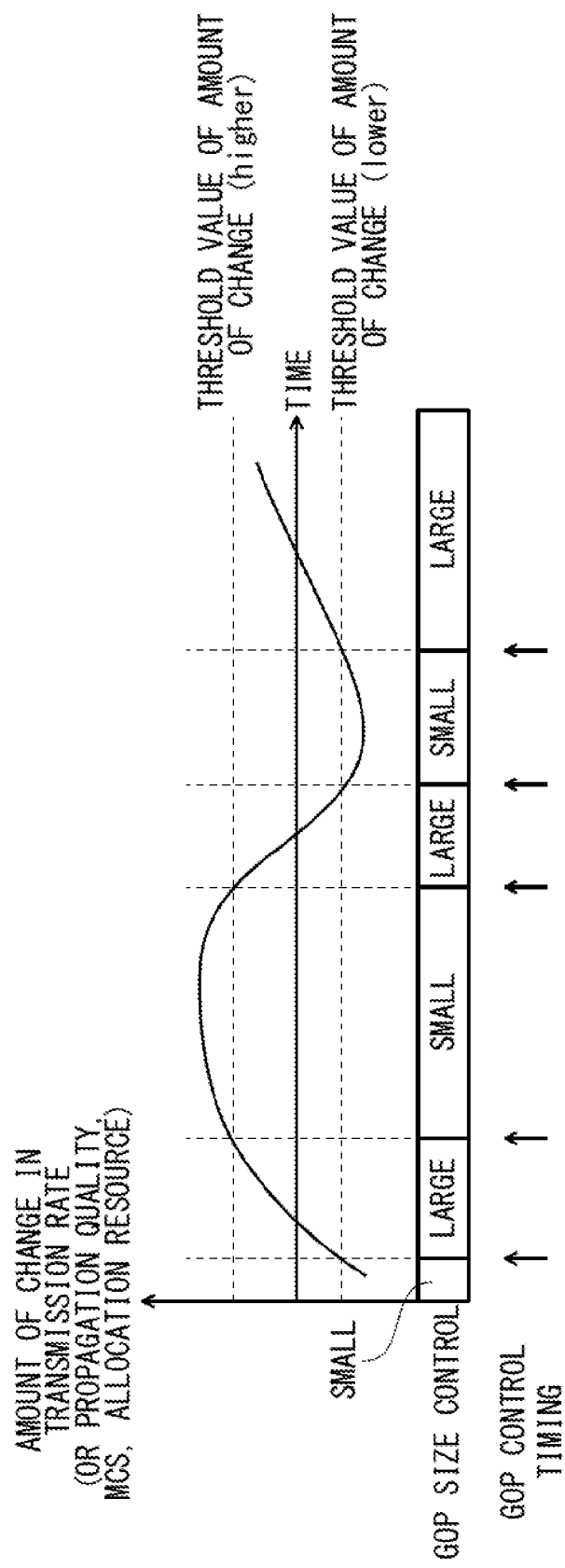
FIG. 3 is a view showing a control operation of cross layer optimization in a first embodiment.

FIG. 3 is a view showing a control operation of cross layer optimization in a first embodiment. In the first embodiment, when performing parameter control for cross layer optimization, variable control of the GOP size is performed according to the amount of change in the transmission rate of the transmission channel (transmission channel parameter). Moreover, in addition the PHY transmission rate in a physical layer, it is also possible to use the propagation quality, the MCS, an allocation resource, and the like as transmission channel parameters and to perform control according to the situation of their changes.

In this case, when the transmission channel parameters (the PHY transmission rate, the propagation quality, the MCS, and the allocation resource) change or when the amount of change in the above transmission channel parameters per unit time exceeds a determined value, the GOP size is changed to Small. In this manner, degradation of the video quality when followability to propagation changes is not sufficient is suppressed while improving followability to propagation changes. Since the ratio of the number of I pictures can be increased by reducing the GOP size, it is possible to reduce error propagation at the time of video decoding. In addition, when changes in the transmission channel parameters are not those described above (when the amount of change is equal to or less than a determined value), an increase in the amount of encoded video data according to an increase in the number of I pictures when the GOP size is reduced is absorbed on average by increasing the GOP size. In the example shown in FIG. 3, as a threshold value of the amount of change, threshold values are set on both the positive and negative sides, so that the GOP size is controlled in both a case where the transmission channel parameters change in an increasing direction and a case where the transmission channel parameters change in a decreasing direction. In addition, it is also possible to increase the GOP size while reducing the video encoding rate to reduce the amount of encoded video data further.

Second Embodiment

Figure 4:
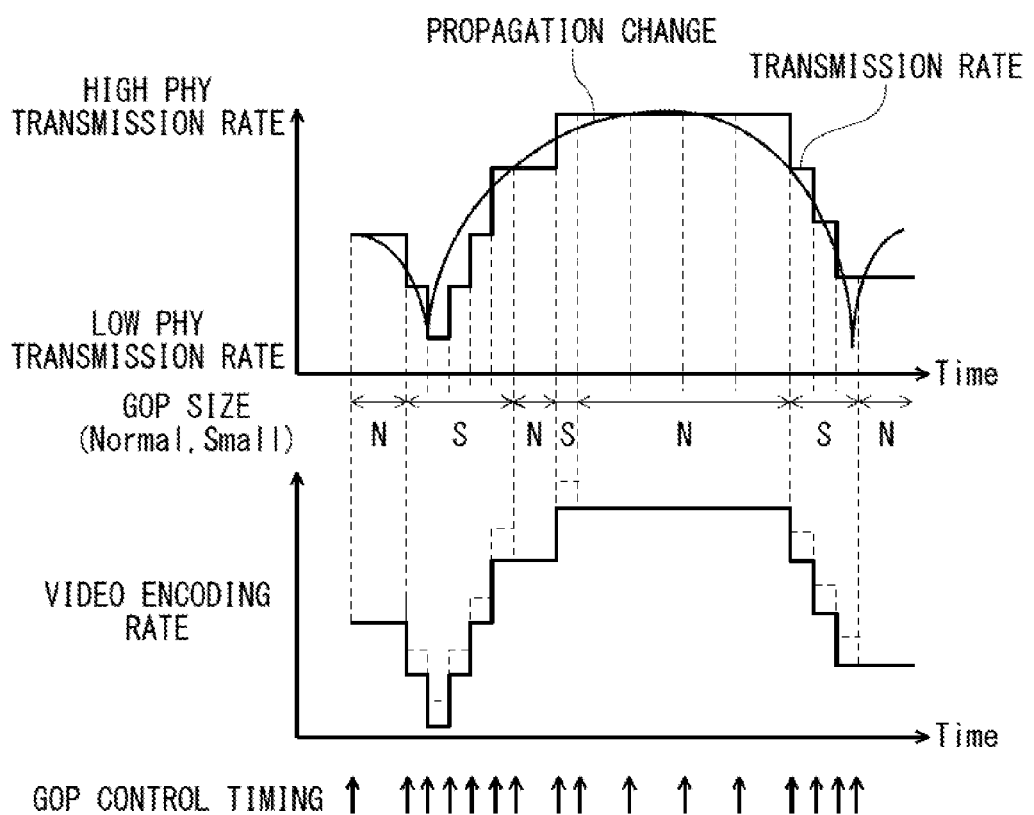
FIG. 4 is a view showing a control operation of cross layer optimization in a second embodiment.

FIG. 4 is a view showing a control operation of cross layer optimization in a second embodiment. In the second embodiment, when performing parameter control for cross layer optimization, a parameter update interval is variable, and parameters are set such that a change in the PHY transmission rate and the GOP size are associated with each other. That is, variable control of the GOP size is performed according to the situation of changes in the PHY transmission rate (linked to band changes (propagation changes) in a physical layer).

In this case, when the PHY transmission rate is a lower rate than the last transmission rate, the GOP size is changed to Small (S). Moreover, also when the PHY transmission rate is a higher rate than the last transmission rate, the GOP size is changed to Small (S) On the other hand, when the PHY transmission rate is the same rate as the last transmission rate, the GOP size is changed to the normal size (default value) (N: Normal). In addition, when changing the GOP size from Normal to Small, the video encoding rate (spatial resolution) or the frame rate (time resolution) is reduced simultaneously in order to prevent an increase in the amount of data. By the above control operation, when the amount of change in the transmission channel parameters is large enough to exceed a determined value, followability to propagation changes is increased by changing the GOP size to Small, so that degradation of the video quality can be suppressed even when followability to propagation changes is not sufficient. In addition, when the GOP size is changed to Small, an increase in the amount of encoded video data can be suppressed by reducing the video encoding rate or the frame rate. Therefore, it is possible to improve the video reception quality under propagation changes while suppressing an increase in the amount of encoded video data.

Third Embodiment

Figure 5:
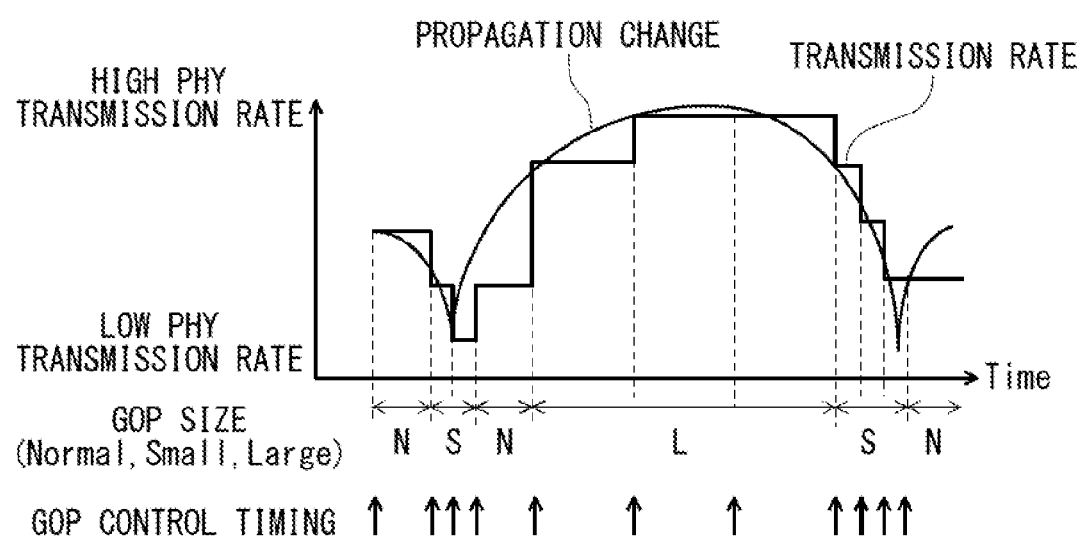
FIG. 5 is a view showing a control operation of cross layer optimization in a third embodiment.

FIG. 5 is a view showing a control operation of cross layer optimization in a third embodiment. In the third embodiment, a part of the control in the second embodiment is changed, and the GOP size is increased or decreased according to a change in the PHY transmission rate.

In this case, when the PHY transmission rate is a lower rate than the last transmission rate, the GOP size is changed to Small (S). On the other hand, when the PHY transmission rate is a higher rate than the last transmission rate, the GOP size is changed to Large (L). In addition, when the PHY transmission rate is the same rate as the last transmission rate, the GOP size is changed to the normal size (default value) (N). By the above control operation, it is possible to improve the video reception quality under propagation changes while suppressing an increase in the amount of encoded video data. In addition, when the PHY transmission rate is changed to a high rate, an increase in the amount of encoded video data according to an increase in the number of I pictures when the GOP size is changed to Small can be absorbed by increasing the GOP size.

Fourth Embodiment

In the fourth embodiment, when performing parameter control for cross layer optimization, a parameter update interval is variable, and parameters are set such that the amount of change in the PHY transmission rate and the GOP size are associated with each other. That is, noting the amount of change in the PHY transmission rate in a decreasing direction, variable control of the GOP size is performed according to the situation of changes in the PHY transmission rate.

In this case, when the amount of change in the PHY transmission rate is larger than a determined amount of change in the negative direction (decreasing direction), the GOP size is changed to Small. On the other hand, when the amount of change in the PHY transmission rate is equal to or less than the determined amount of change in the negative direction (decreasing direction), the GOP size is changed to Large. By the above control operation, when the PHY transmission rate changes in the decreasing direction so as to exceed a determined amount, followability to propagation changes can be increased by reducing the GOP size. As a result, it is possible to improve the video reception quality. In addition, it is possible to suppress degradation of the video quality when followability to propagation changes is not sufficient. In addition, when the amount of change in the PHY transmission rate is equal to or less than the determined value, an increase in the amount of encoded video data according to a reduction in the compress ion rate when the GOP size is reduced can be absorbed by increasing the GOP size. Therefore, it is possible to improve the video reception quality while suppressing an increase in the amount of encoded video data.

Fifth Embodiment

Figure 6:
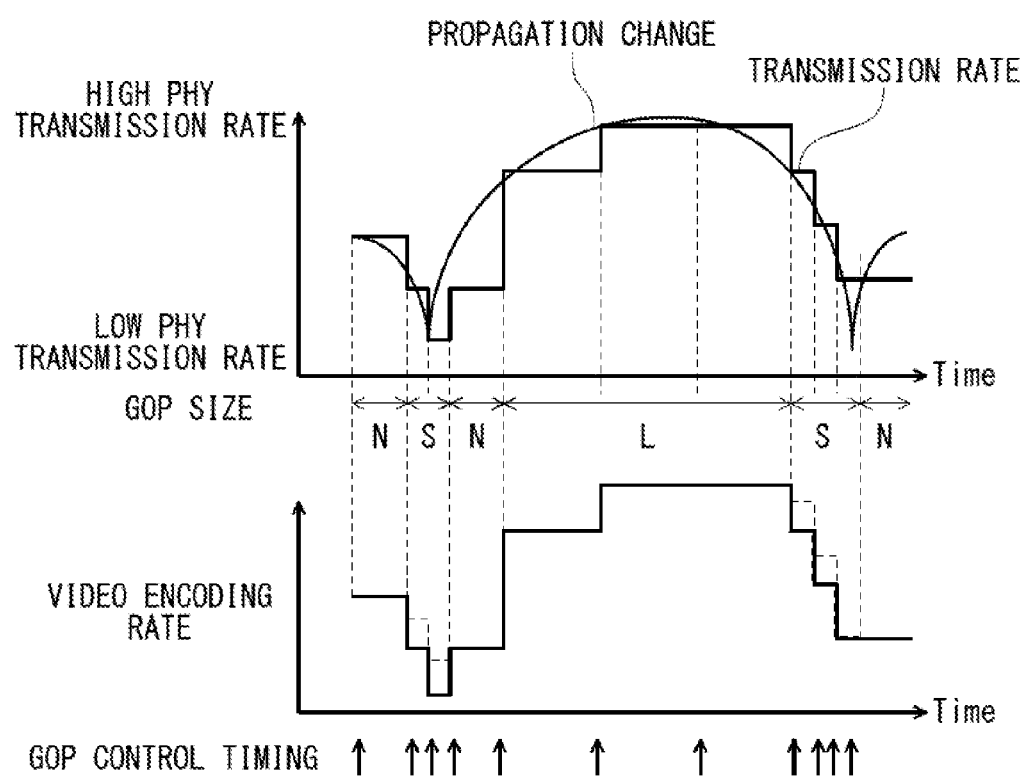
FIG. 6 is a view showing a control operation of cross layer optimization in a fifth embodiment.

FIG. 6 is a view showing a control operation of cross layer optimization in a fifth embodiment. In a fifth embodiment, when performing parameter control for cross layer optimization, the video encoding rate (spatial resolution) or the frame rate (time resolution) are simultaneously reduced in addition to the control of the third embodiment at the time of switching from the GOP size Large (L) or the GOP size normal (N) to the GOP size small (S). By the above control operation, it is possible to improve the video reception quality while suppressing an increase in the amount of encoded video data. In addition, in error correction coding in a physical layer or a data link layer, it is possible to apply encoding (encoding at the low encoding rate) for increasing the degree of redundancy further. As a result, it is possible to suppress the degradation of the video quality.

Sixth Embodiment

Figure 7:
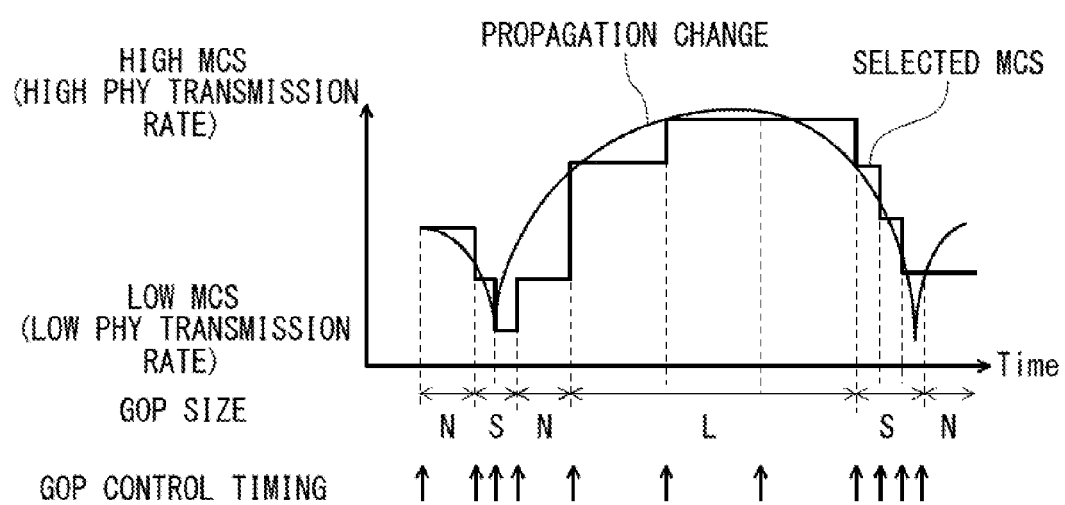
FIG. 7 is a view showing a control operation of cross layer optimization in a sixth embodiment.

FIG. 7 is a view showing a control operation of cross layer optimization in a sixth embodiment. In the sixth embodiment, when performing parameter control for cross layer optimization, a parameter update interval is variable, the MCS is used as a transmission channel parameter, and parameters are set such that a change in the MCS and the GOP size are associated with each other. That is, variable control of the GOP size is performed according to the situation of changes in the MCS setting (linked to band changes (propagation changes) in a physical layer).

In this case, when the MCS setting is a lower MCS (equivalent to the low PHY transmission rate) than the last MCS, the GOP size is changed to Small (S). On the other hand, when the MCS setting is a higher MCS (equivalent to the higher PHY transmission rate) than the last MCS, the GOP size is changed to Large (L). In addition, when the MCS setting is the same MOS as the last MCS, the GOP size is changed to the normal size (default value) (N). By the above control operation, when the MCS setting changes to a lower MCS than the last MCS, followability to propagation changes is increased by changing the GOP size to Small, so that degradation of the video quality can be suppressed even when followability to propagation changes is not sufficient. In addition, when the MOP setting changes to a higher MCS than the last MCS, an increase in the amount of encoded video data according to an increase in the number of I pictures when the GOP size is changed to Small can be absorbed by increasing the GOP size. Therefore, it is possible to improve the video reception quality under propagation changes while suppressing the increase in the amount of encoded video data.

Modifications of the above embodiment are shown below.
(First Modification)

As a determination condition for changing the GOP size, the number of PHY block errors in the last GOP period or the number of block errors of the video encoding unit [for example, a thread unit] is used instead of changes in transmission channel parameters, such as a PHY transmission rate, propagation quality, MCS, and an allocation resource, and control to change the GOP size to Small is performed when these exceed determined values. On the other hand, when the number of block errors is equal to or less than a determined value, it is assumed that a certain amount of followability to propagation changes is met, and the GOP size is maintained. Here, the determined value is set using the number of block errors (or the number of packet errors), which can be corrected by the outer code, when outer encoding is introduced as error correction coding. Alternatively, it is also possible to use a value in a range where the video distortion is equal to or smaller than a determined value at the time of video decoding.

(Second Modification)

At the timing before video encoding of a GOP unit starts, the selection of the PHY transmission rate (or MCS selection) is performed. In this case, in consideration of a transmission delay ΔD until the encoded video data is actually transmitted through the transmission channel from the input of the video encoding unit and a feedback delay ΔFB until the control information from the transmission channel is transmitted to the video encoding unit, a PHY transmission rate at the time which is ahead by time (ΔD+ΔFB) is predicted on the basis of a fading frequency of the transmission channel or the like. For example, between video encoding rate control timings (GOP size control timings), linear prediction based on a plurality of measurement results is performed. Therefore, it is possible to select more appropriate transmission channel parameters.

(Third Modification)

Information regarding the current parameter setting values (MCS, video encoding rate, and the like) and only the near parameters is exchanged between layers to estimate the video distortion. That is, the size in a direction in which the video encoding rate increases or decreases is increased to estimate the video distortion. In this manner, it is possible to estimate the video distortion precisely while reducing the amount of processing and the amount of information related to processing, and it is possible to set parameters, such as the GOP size, appropriately on the basis of the video distortion estimation result.

Hereinafter, as wireless communication devices corresponding to the embodiments described above, examples of the more specific configuration and processing of a wireless transmission device and a wireless receiving device are shown. Here, the wireless transmission device corresponds to a component with a signal transmission function in the wireless communication device, and the wireless receiving device corresponds to a component with a signal receiving function in the wireless communication device.

First Example

A first example corresponds to the first embodiment described above.

The first example is an example applied to downlink video transmission in a state where the wireless transmission device is a base station of the wireless communication system and the wireless receiving device is a terminal of the wireless communication system. In this case, the wireless transmission device (base station) assigns wireless resources in the host device, and transmits video data to the wireless receiving device (terminal).

<Configuration and Operation of the Wireless Transmission Device>

Figure 8:
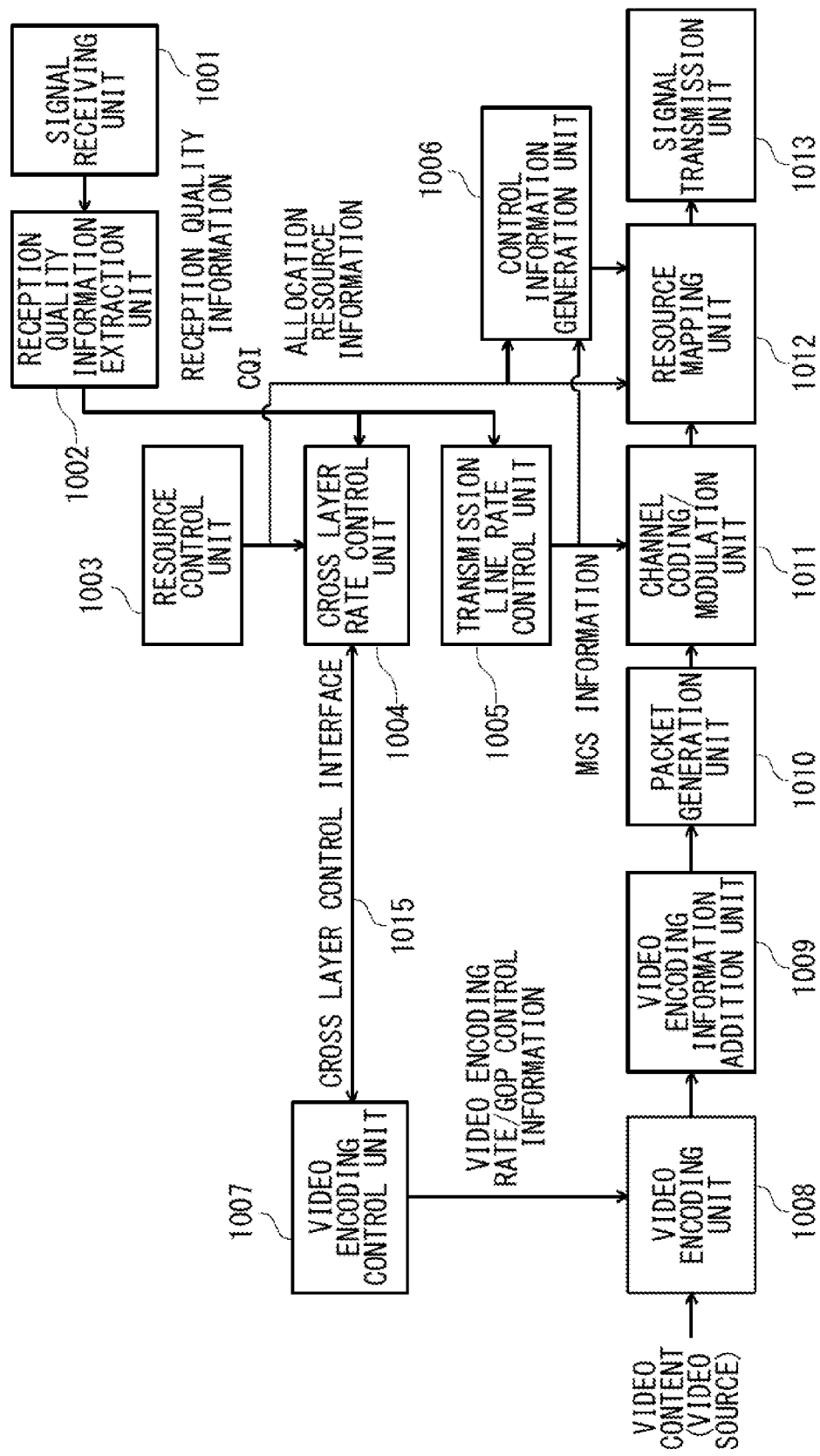
FIG. 8 is a block diagram showing the configuration of a wireless transmission device related to a first example.

FIG. 8 is a block diagram showing the configuration of the wireless transmission device related to the first example. The wireless transmission device is configured to include a signal receiving unit 1001, a reception quality information extraction unit 1002, a resource control unit 1003, a cross layer rate control unit 1004, a transmission channel rate control unit 1005, a control information generation unit 1006, a video encoding control unit 1007, a video encoding unit 1008, a video encoding information addition unit 1009, a packet generation unit 1010, a channel coding/modulation unit 1011, a resource mapping unit 1012, and a signal transmission unit 1013. Here, the cross layer rate control unit 1004 and the video encoding control unit 1007 realize a function of the parameter control unit.

The resource control unit 1003 determines the allocation of the resource at a time and a frequency, which is used for video transmission, among the available wireless resources (frequency carrier band) and outputs the allocation resource information. As the allocation resource information, resource position information, resource size information, resource arrangement information (distributed allocation or localized allocation), and the like are included. In addition, the allocation resource information includes MCS information, which is information regarding the encoding rate R and modulation scheme information (QPSK, 16QAM, 64QAM, and the like), in the channel coding/modulation unit 1011 when performing video transmission.

The signal receiving unit 1001 receives wireless signals transmitted from one or a plurality of wireless communication devices, which are partners that perform video transmission through wireless communication, through an antenna and performs frequency conversion of the received signals from the carrier frequency band to the baseband frequency band. The reception quality information extraction unit 1002 extracts CQI, as reception quality information of the wireless transmission channel transmitted from the wireless communication partner, on the basis of the signals received by the signal receiving unit 1001.

The transmission channel rate control unit 1005 sets the encoding rate R and the modulation scheme information (QPSK, 16 QA, 64QAM, and the like) used in the channel coding/modulation unit 1011, as MCS information, on the basis of the reception quality information CQI acquired from the reception quality information extraction unit 1002, and outputs the MCS information to the channel coding/modulation unit 1011.

The control information generation unit 1006 generates information including allocation resource information, such as transmission data destination information, resource position information, resource size information, resource arrangement information, and MCS information, and various kinds of information as control information based on a predetermined format.

The video encoding unit 1008 performs video encoding of the video content (video source), which has video data including a moving image or a still image as a source, on the basis of the output of the video encoding control unit 1007. As video encoding, video encoding methods, such as H.264 and MPEG, are used. In H.264, MPEG2/MPEG4, and the like which are standardized, the video encoding process is performed in units of GOP as disclosed in NPL 3. An I picture subjected to encoding in frames, a P picture subjected to predictive coding between forward frames, and a B picture subjected to predictive coding between bidirectional frames are included in a GOP, and these frames are encoded so as to be associated with each other. Accordingly, timing of a minimum unit of video encoding rate control is a GOP unit. In addition, in each video-encoded frame, the B picture has the highest compression rate, and the compression rate is smaller in the order of P picture and I picture. Hereinafter, the GOP size will be defined and used as the number K of pictures included in the GOP.

Figure 9:
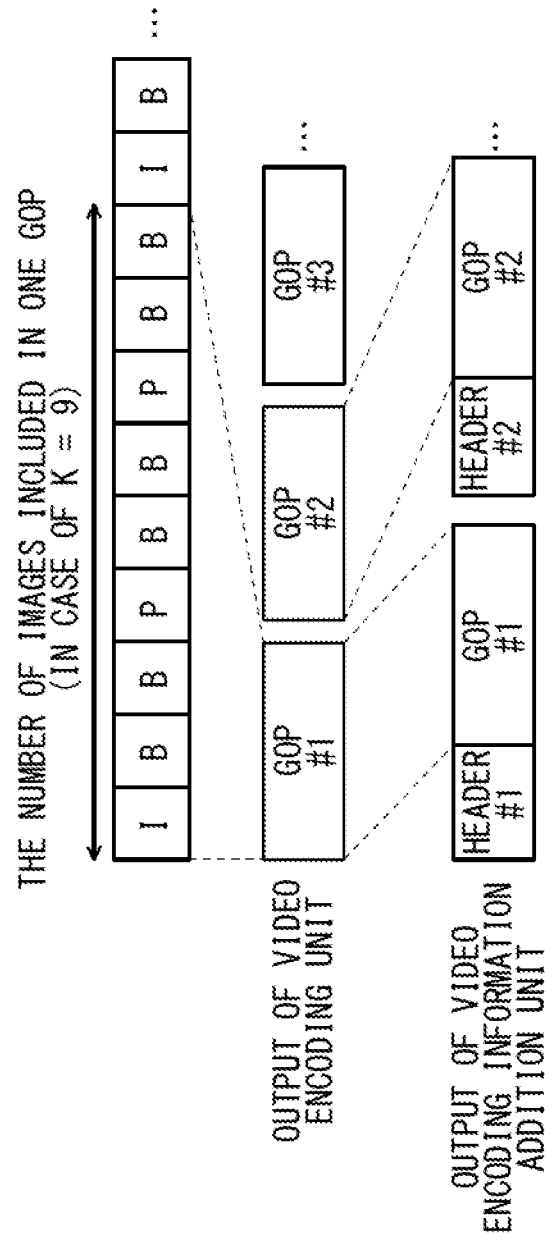
FIG. 9 is an explanatory view of the operation showing outputs of a video encoding unit and a video encoding information addition unit.

The video encoding information addition unit 1009 adds an encoding parameter, which is used at the time of video encoding in the video encoding unit 1008, to the GOP unit as video encoding information. FIG. 9 is an explanatory view of the operation showing outputs of a video encoding unit and a video encoding information addition unit. FIG. 9 shows an example in the case of GOP size K=9. The video encoding unit 1008 outputs encoded video data, which is performed in units of GOP, as GOP#n (n=1, 2 3, . . . ). The video encoding information addition unit 1009 adds video encoding information to each header #n of the n-th GOP#n and outputs the result. The packet generation unit 1010 forms a packet based on a predetermined format for the output of the video encoding information addition unit 1009 and outputs the result. In addition, a CRC (Cyclic Redundancy Check) bit for error detection is added to each packet.

The channel coding/modulation unit 1011 performs channel coding (transmission channel encoding) and modulation for the input packet on the basis of the MCS information (including the encoding rate and the modulation scheme) designated from the transmission channel rate control unit 1005. In this case, the channel coding/modulation unit 1011 generates coded bit data by performing an error correction coding process with the designated encoding rate R, and also generates symbol data by performing modulation on the basis of the designated modulation scheme (QPSK, 16QAM, 64QAM, and the like).

The resource mapping unit 1012 maps the control information on the resource determined in advance, and assigns the output of the channel coding/modulation unit 1011 to the wireless resource at the time and frequency on the basis of the allocation resource information designated from the resource control unit 1003. Here, when OFDMA (Orthogonal Frequency Division Multiple Access) is used as secondary modulation, the resource size is set with a resource unit, which includes a predetermined number of subcarriers and a predetermined number of OFDM symbols, as a minimum allocation unit. The signal transmission unit 1013 performs frequency conversion of the output of the resource mapping unit 1012 from the baseband frequency band to the carrier frequency band and outputs the result to the wireless transmission channel through an antenna so that the result is transmitted to the wireless communication device of the communication partner.

The cross layer rate control unit 1004 predicts the transmission rate (PHY transmission rate) of a wireless transmission section on the basis of the allocation resource information and the reception quality information CQI, and notifies the video encoding control unit 1007 of the result through a cross layer control interface (I/F) 1015.

Figure 10:
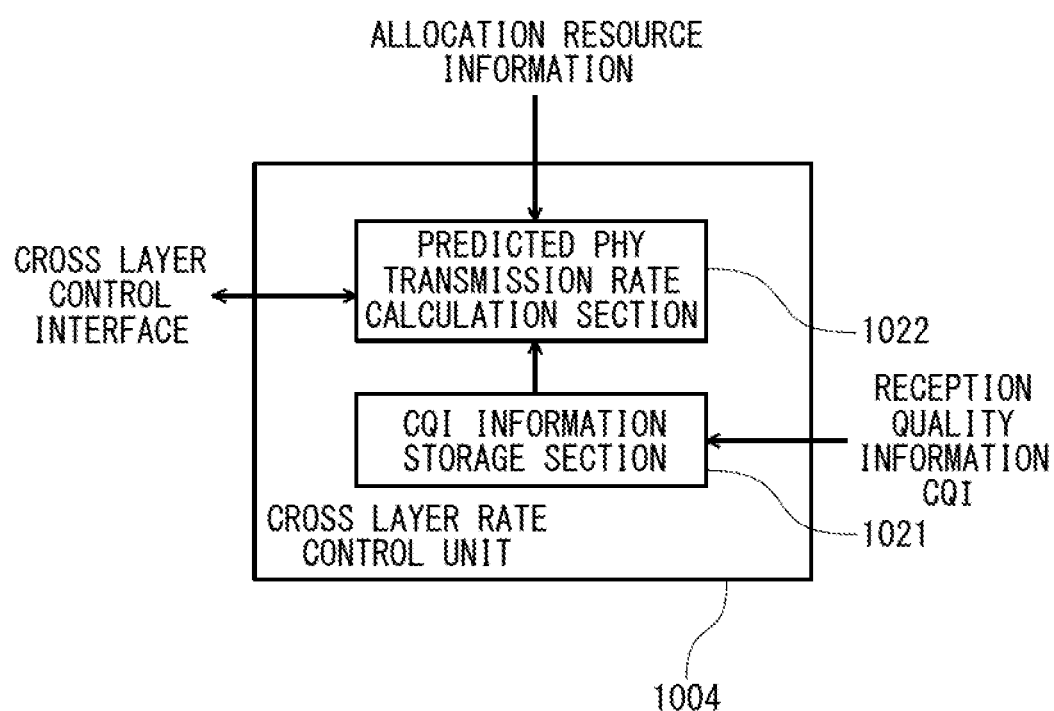
FIG. 10 is a block diagram showing an example of the configuration of a cross layer rate control unit.

FIG. 10 is a block diagram showing an example of the configuration of the cross layer rate control unit. The cross layer rate control unit 1004 is configured to include a CQI information storage section 1021 and a predicted PHY transmission rate calculation section 1022. The CQI information storage section 1021 stores the reception quality information CQI acquired from the reception quality information extraction unit 1002 in a storage memory with a circular buffer configuration. The predicted PHY transmission rate calculation section 1022 predicts a PHY transmission rate, and calculates a PHY transmission rate PR (predicted PHY transmission rate) of the prediction result. Here, the PHY transmission rate prediction process is performed as follows. In consideration of a processing time PD until the n-th video encoding unit GOP#n encoded and output by the video encoding unit 1008 is transmitted through the wireless transmission channel, the CQI estimate of the PD time destination is calculated from the reception quality situation of a current and a previous time of the CQI information storage section 1021 which stores the reception quality information CQI. Then, an MCS (MCS#n) by which the target packet error rate (PER) is acquired is selected, and the transmission rate in a wireless transmission section is calculated using the allocation resource information.

Figure 11:
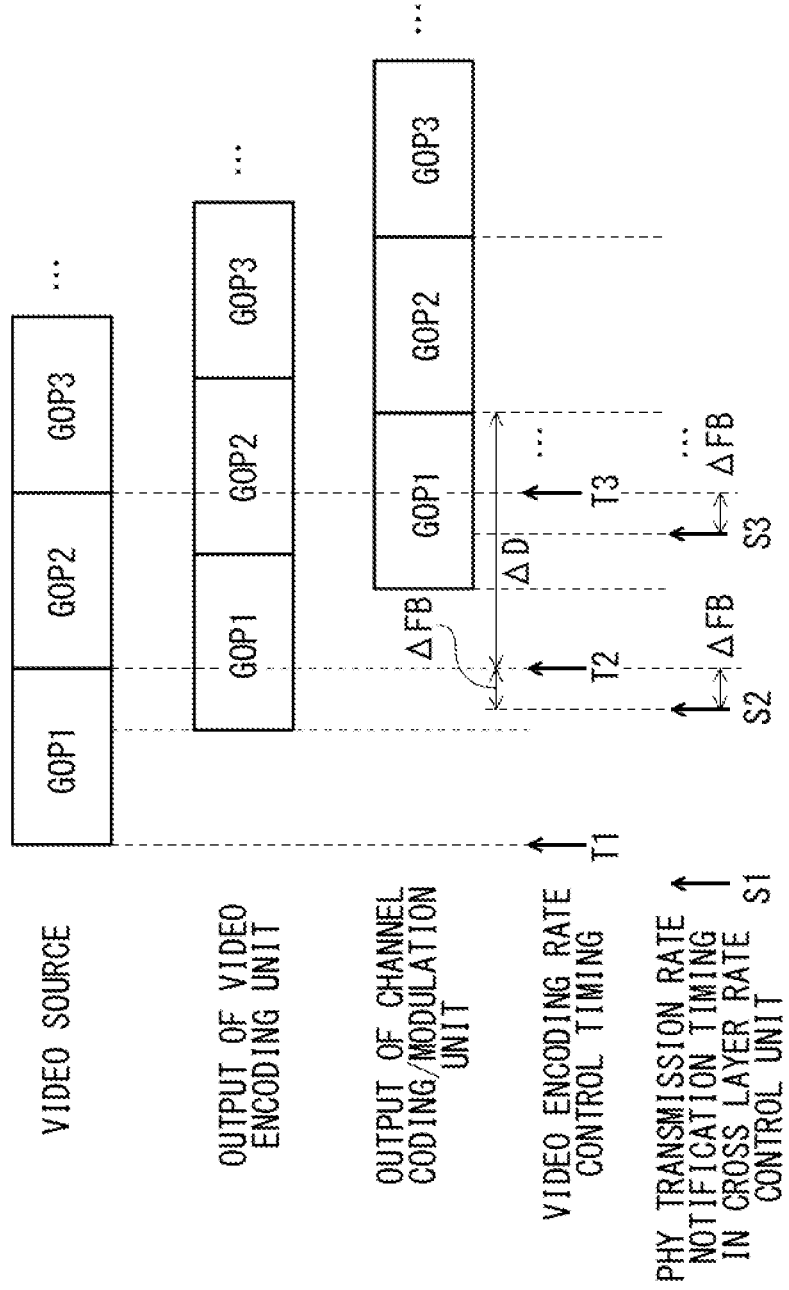
FIG. 11 is an explanatory view of the operation showing the timing of an output of a video encoding unit and an output of a channel coding/modulation unit.

FIG. 11 is an explanatory view of the operation showing the timing of an output of the video encoding unit and an output of the channel coding/modulation unit. FIG. 11 shows the output timing of each unit when the video content (video source) is input in units of a GOP. In addition, within the GOP, the order of data may be changed by interchange or the like.

Here, focusing on the n-th GOP#n (n=1, 2, 3, . . . ), the time when video encoding on the video source included in the GOP#n is started in the video encoding unit 1008 is Tn, and the time when output of the encoded video data is started in the channel coding/modulation unit 1011 is (Tn+ΔD). Here, ΔD is a transmission delay taken from the input of the video encoding unit 1008 to the output of the channel coding/modulation unit 1011. In addition, in the control system of the video encoding unit 1008, a jitter (variation) ΔFB of the processing delay or transmission delay until the prediction result of the PHY transmission rate in the cross layer rate control unit 1004 is notified to the video encoding control unit 1007 through the cross layer control interface 1015 may be expected. In consideration of this time, the PHY transmission rate prediction in the cross layer rate control unit 1004 is performed by predicting the time PD (=ΔD+ΔFB) destination from the present. In addition, the timing Sn at which the predicted value of the PHY transmission rate is notified to the video encoding control unit 1007 is notified from the video encoding control unit 1007 to the cross layer rate control unit 1004 through the cross layer control interface 1015. Here, the timing Sn is a time of (Tn−ΔFB). On the basis of this timing notification, the cross layer rate control unit 1004 notifies the video encoding control unit 1007 of the predicted value of the PHY transmission rate at time Sn. The predicted value of the PHY transmission rate is calculated by applying linear prediction based on a plurality of CQI information items obtained at timing intervals (Sn−1, Sn) notified to the video encoding control unit 1007.

In this manner, the video encoding control unit 1007 can acquire the predicted value of the PHY transmission rate for the GOP#n at the timing before video encoding of the target GOP#n starts. On the basis of the predicted value of the PHY transmission rate, the video encoding control unit 1007 can set parameters of video encoding, such as a GOP size change, a quantization size change, and a frame rate change, according to band changes in the wireless transmission channel (transmission rate change and propagation change).

In addition, although the example shown in the drawings has been described using the case where the GOP size is fixed, the above may similarly be applied to a case where the GOP size is variable. In addition, the PD which is a prediction time of the PHY transmission rate may be set in advance as a fixed value, or it is possible to use a value obtained by measuring a processing delay using the test pattern. Alternatively, the PD may be notified as a parameter from the video encoding control unit 1007 to the cross layer rate control unit 1004 through the cross layer control interface 1015.

The video encoding control unit 1007 determines parameters, such as the GOP size, the quantization size Q, and the video size when performing video encoding, on the basis of the information of the predicted value of the PHY transmission rate from the cross layer rate control unit 1004 acquired through the cross layer control interface 1015. Then, the video encoding control unit 1007 notifies the video encoding unit 1008 of the determined parameter and performs variable control of the video encoding rate for the video encoding unit 1008. Here, as the quantization size Q, a quantization size Q which becomes the last video encoding rate comparable to less than the predicted value of the PHY transmission rate is selected. On the other hand, the GOP size is changed as follows.

On the basis of the information regarding the predicted value of the PHY transmission rate from the cross layer rate control unit 1004, the video encoding control unit 1007 changes the GOP size depending on whether or not the amount of change is larger than a determined value according to the amount of change in the predicted value of the PHY transmission rate due to propagation changes.

Figure 12:
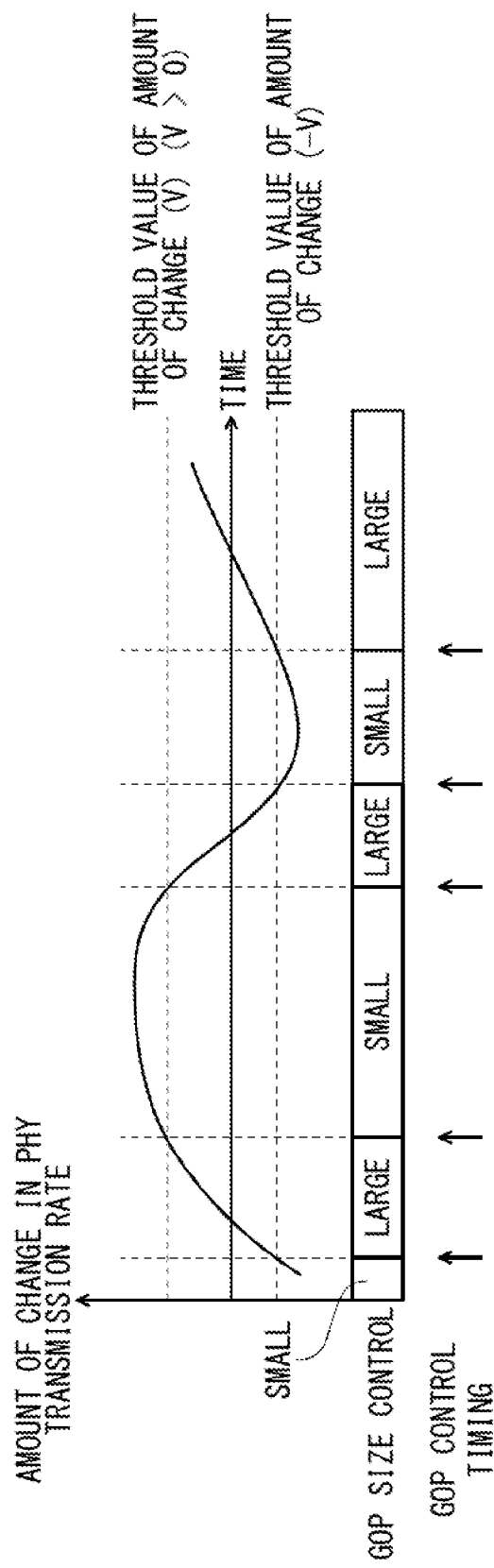
FIG. 12 is a view showing the variable control operation of the GOP size of a video encoding control unit in the first example.

FIG. 12 is a view showing the variable control operation of the GOP size of the video encoding control unit in the first example. On the basis of the information regarding the predicted value of the PHY transmission rate, the video encoding control unit 1007 changes the GOP size when the amount of change in the predicted value of the PHY transmission rate due to propagation changes exceeds a determined amount of change. The determined amount of change is set to V>0 including both an increasing direction V and a decreasing direction −V. Here, the GOP size is changed to the smaller size (GOP size Small: S) when the absolute value of the amount of change in the predicted value of the PHY transmission rate is larger than the determined amount of change V, and the GOP size is changed to the larger size (GOP size Large: L) when the absolute value of the amount of change in the predicted value of the PHY transmission rate is equal to or less than the determined amount of change V.

In addition, the GOP size may be given as a rate of change in the GOP size instead of switching between the value of the large GOP and the value of the small GOP. In this case, for the standard GOP size (or the GOP size at the start of video transmission), when the absolute value of the amount of change in the predicted value of the PHY transmission rate is larger than the determined amount of change V, a value obtained by multiplying the GOP size by the rate of change smaller than 1 and rounding off the result to an integral value is used as the GOP size Small (S). On the other hand, when the absolute value of the amount of change in the predicted value of the PHY transmission rate is equal to or less than the determined amount of change V, a value obtained by multiplying the GOP size by the rate of change larger than 1 and rounding off the result to an integral value is used as the GOP size Large (L). Such control based on the rate of change of the GOP size is suitable for a case of performing video encoding by changing the GOP size according to the video content.

As described above, the interval of parameter update to the video encoding control unit 1007, which is performed through the cross layer control interface 1015 in the cross layer rate control unit 1004, can be changed on the basis of the video encoding timing of the GOP unit in the video encoding unit 1008, and the PHY transmission rate (transmission bandwidth) and the GOP size can be controlled so as to be associated with each other. That is, the GOP size can be changed according to the amount of change in the PHY transmission rate (according to the size of the propagation change).

When the amount of change in the transmission channel parameters becomes larger than the determined value due to propagation changes (for example, when a sudden propagation change or a large propagation change occurs), degradation of the video quality when followability to propagation changes is not sufficient can be suppressed by reducing the GOP size which is a video encoding unit. In addition, the video quality can be improved by increasing followability to propagation changes. In addition, when the amount of change in the transmission channel parameters is equal to or less than the determined value, an increase in the amount of encoded video data according to a reduction in the compression rate when the GOP size is reduced can be absorbed by increasing the GOP size. In this manner, it is possible to improve the video reception quality while suppressing an increase in the amount of encoded video data.

<<Configuration and Operation of the Wireless Receiving Device>>

Figure 13:
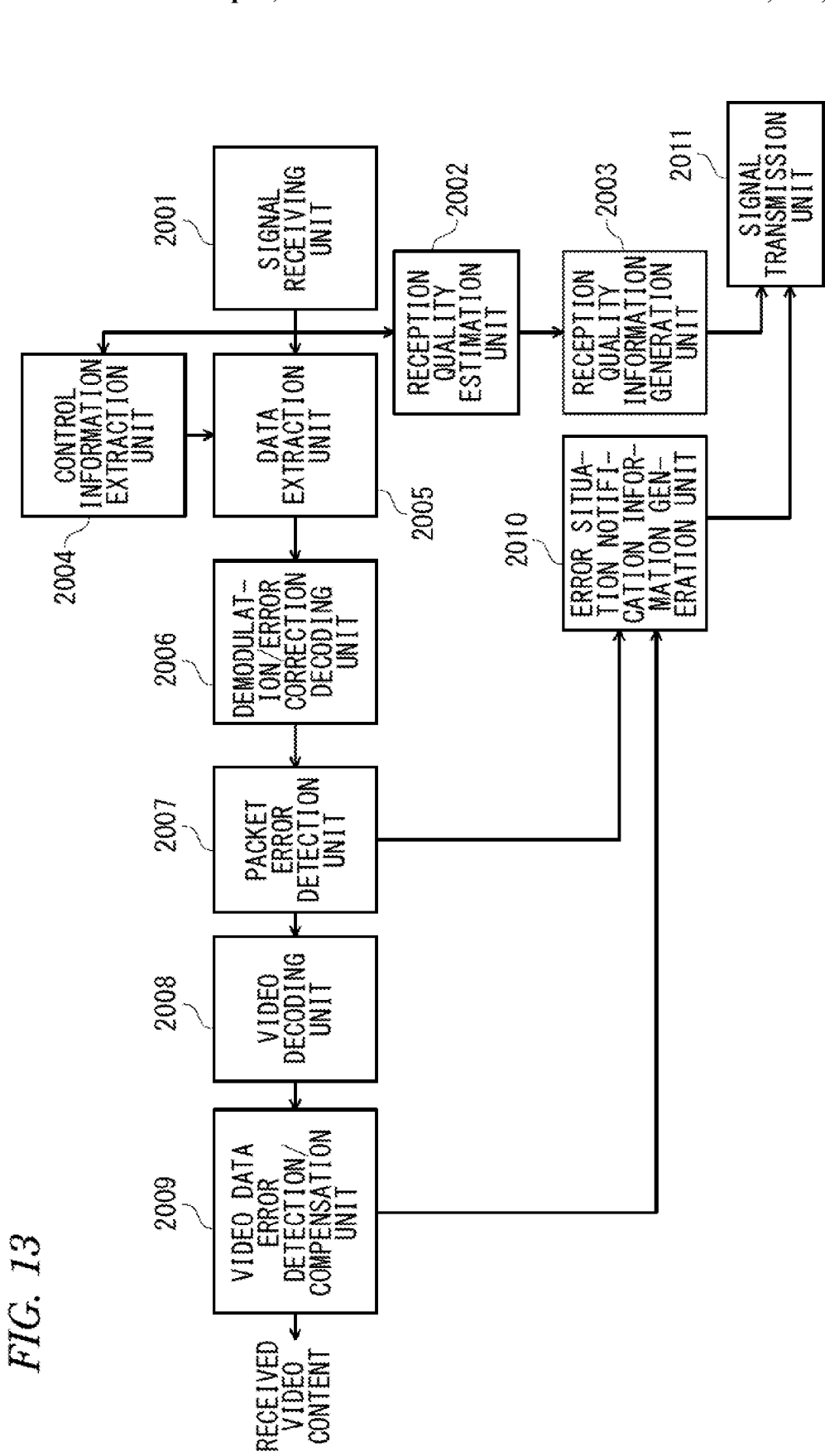
FIG. 13 is a block diagram showing the configuration of a wireless receiving device related to the first example.

FIG. 13 is a block diagram showing the configuration of the wireless receiving device related to the first example. The wireless receiving device is configured to include a signal receiving unit 2001, a reception quality estimation unit 2002, a reception quality information generation unit 2003, a control information extraction unit 2004, a data extraction unit 2005, a demodulation/error correction decoding unit 2006, a packet error detection unit 2007, a video decoding unit 2008, a video data error detection/compensation unit 2009, an error situation notification information generation unit 2010, and a signal transmission unit 2011.

The signal receiving unit 2001 receives a wireless signal transmitted from the wireless communication device, which is a partner that performs video transmission through wireless communication, through an antenna and performs frequency conversion of the received signal from the carrier frequency band to the baseband frequency band. On the basis of the signal received by the signal receiving unit 2001, the reception quality estimation unit 2002 estimates the reception quality of the wireless transmission channel between the partner device and the host device, for example, using a reception result of a reference signal. The reception quality information generation unit 2003 generates CQI as the reception quality information on the basis of the output of the reception quality estimation unit 2002.

When the signal received by the signal receiving unit 2001 has been subjected to secondary modulation, such as OFDMA, the control information extraction unit 2004 performs the demodulation operation to extract the modulated symbolic data in which notification information is included, thereby extracting the control information. Here, the control information includes allocation resource information, such as transmission data destination information, resource position information, resource size information, resource arrangement information, and MCS information.

When the signal received by the signal receiving unit 2001 has been subjected to secondary modulation, such as OFDMA, the data extraction unit 2005 performs the demodulation operation to extract the modulated symbolic data destined for the host device on the basis of extracted control information. The demodulation/error correction decoding unit 2006 converts the extracted symbolic data into channel-coded (transmission-channel-coded) bit data by performing demodulation processing based on the designated modulation scheme (QPSK, 16QAM, 64QAM, and the like) on the extracted symbolic data. In addition, the demodulation/error correction decoding unit 2006 performs an error correction decoding process on the channel-coded bit data.

The packet error detection unit 2007 detects whether or not the packet has been received successfully on the basis of the CRC bit for error detection added to each packet. Then, according to the error detection result, unique index information given to each packet and ACK (reception OK) are output as packet error information to the error situation notification information generation unit 2010 when the packet has been received correctly, and unique index information given to each packet and NACK (reception NG) are output as packet error information to the error situation notification information generation unit 2010 when the packet has not been received correctly.

The video decoding unit 2008 stores primarily the packet received successfully in a buffer, and starts a video decoding process when the data which makes up a minimum unit of video encoding is prepared. Here, when the video content is transmitted in real time, if the data which makes up the minimum unit of video encoding is not prepared in real time, processing for discarding the packet data acquired until then is performed. In the video decoding process, the video decoding unit 2008 decodes the video data according to the encoding parameter set on the transmission side on the basis of the video encoding information included in the packet, thereby reproducing the received video content.

The video data error detection/compensation unit 2009 detects a loss (video data error) of the video data based on a packet which has not been acquired in real time. In addition, when the loss of video data is detected, compensation for the video data is performed (Error Concealment). As compensation for video data, for example, video data on the same screen from previously is used again on the basis of the position on the screen (on the field) formed by the video data. As a result, degradation of the video quality can be suppressed. In addition, when the loss of video data is detected at a predetermined frequency or higher, the information is output to the error situation notification information generation unit 2010 as video data loss information.

The error situation notification information generation unit 2010 generates error situation notification information, in a format in which each error can be distinguished, from the packet error information in the packet error detection unit 2007 or the video data loss information (detection information of the number of block errors of a video encoding unit [for example, a thread unit]) in the video data error detection/compensation unit 2009. The signal transmission unit 2011 performs frequency conversion of the error situation notification information and the reception quality information CQI from the baseband frequency band to the carrier frequency band and outputs the result to the wireless transmission channel through an antenna so that the result is transmitted to the wireless communication device of the communication partner.

First Modification of the First Example

As a first modification of the first example, an example in which a PHY transmission rate prediction method has been changed is shown. In the first example described above, on the basis of the information of the predicted value of the PHY transmission rate from the cross layer rate control unit 1004, variable control of the GOP size when performing video encoding is performed by the video encoding control unit 1007. However, the subject of control may be replaced. That is, the same effect may also be obtained in a configuration in which the cross layer rate control unit 1004 determines the GOP size on the basis of the amount of change in the PHY transmission rate and the cross layer rate control unit 1004 sends a notification to the video encoding control unit 1007.

Figure 14:
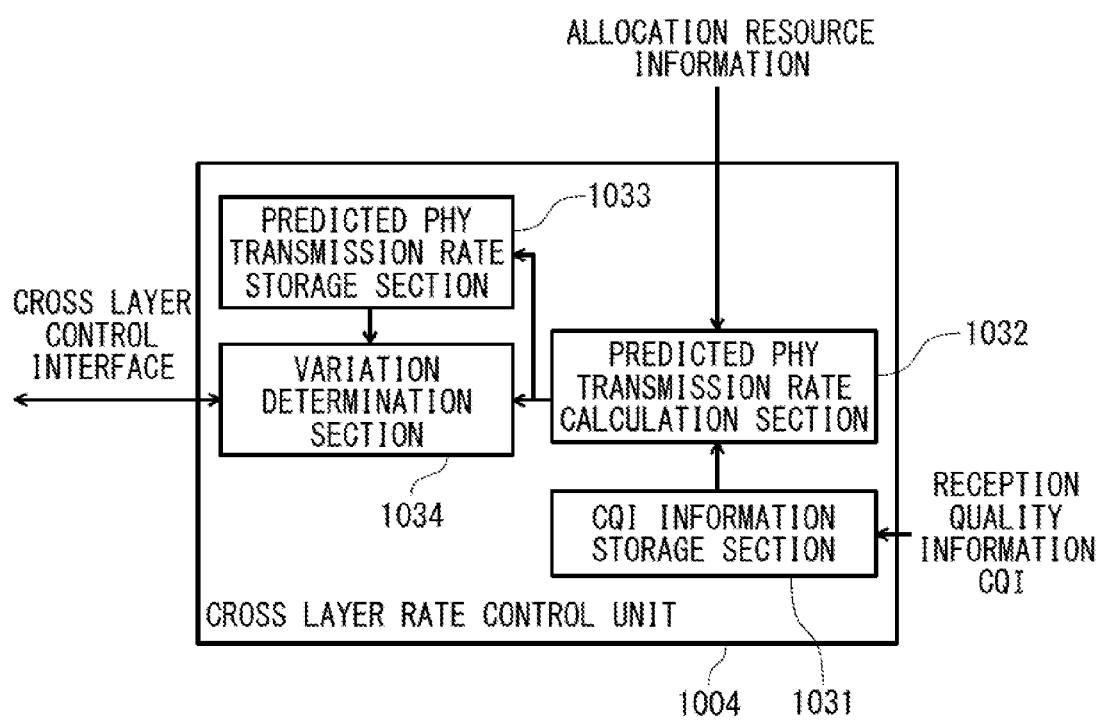
FIG. 14 is a block diagram showing an example of the configuration of a cross layer rate control unit in a first modification of the first example.

FIG. 14 is a block diagram showing an example of the configuration of the cross layer rate control unit in the first modification of the first example. The cross layer rate control unit 1004 is configured to include a predicted PHY transmission rate calculation section 1032, a predicted PHY transmission rate storage section 1033, and a variation determination section 1034. The CQI information storage section 1031 stores the reception quality information CQI acquired from the reception quality information extraction unit 1002 in a storage memory with a circular buffer configuration. In the same manner as in the first example shown in FIG. 10, the predicted PHY transmission rate calculation section 1032 predicts a PHY transmission rate, and calculates a PHY transmission rate PR (predicted PHY transmission rate) of the prediction result. That is, in consideration of the processing time PD until the n-th video encoding unit GOP#n encoded and output by the video encoding unit 1008 is transmitted through the wireless transmission channel, the CQI estimate of the PD time destination is calculated from the reception quality situation of a current and a previous time of the CQI information storage section 1021 which stores the reception quality information CQI. Then, an MCS (MCS#n) by which the target packet error rate (PER) is acquired is selected, and the transmission rate in a wireless transmission section is calculated using the allocation resource information.

The predicted PHY transmission rate storage section 1033 stores the predicted PHY transmission rate calculated by the predicted PHY transmission rate calculation section 1032 in a storage memory with a circular buffer configuration. The variation determination section 1034 calculates the amount of change in the PHY transmission rate using the predicted PHY transmission rate of the previous time stored in the predicted PHY transmission rate storage section 1033 and the predicted PHY transmission rate of the current time calculated by the predicted PHY transmission rate calculation section 1032, compares the calculated amount of change with a determined amount of change, and determines the size relationship.

Then, the cross layer rate control unit 1004 determines the GOP size on the basis of the calculated amount of change in the PHY transmission rate and notifies the video encoding control unit 1007 of the determined GOP size through the cross layer control interface 1015. Alternatively, the amount of change in the PHY transmission rate calculated from the cross layer rate control unit 1004 may be notified to the video encoding control unit 1007 through cross layer control interface 1015, and the video encoding control unit 1007 may determine the GOP size on the basis of the amount of change in the PHY transmission rate. By the above operation, it is possible to calculate the amount of change in the PHY transmission rate and to perform variable control of the GOP size according to the amount of change.

Second Modification of the First Example

As a second modification of the first example, a first example in which a method of determining the video encoding rate and the PHY transmission rate has been changed is shown. In PHY transmission rate prediction processing, the cross layer rate control unit and the video encoding control unit may calculate the predicted PHY transmission rate and select the MCS using information of video distortion D caused by video encoding.

Figure 15:
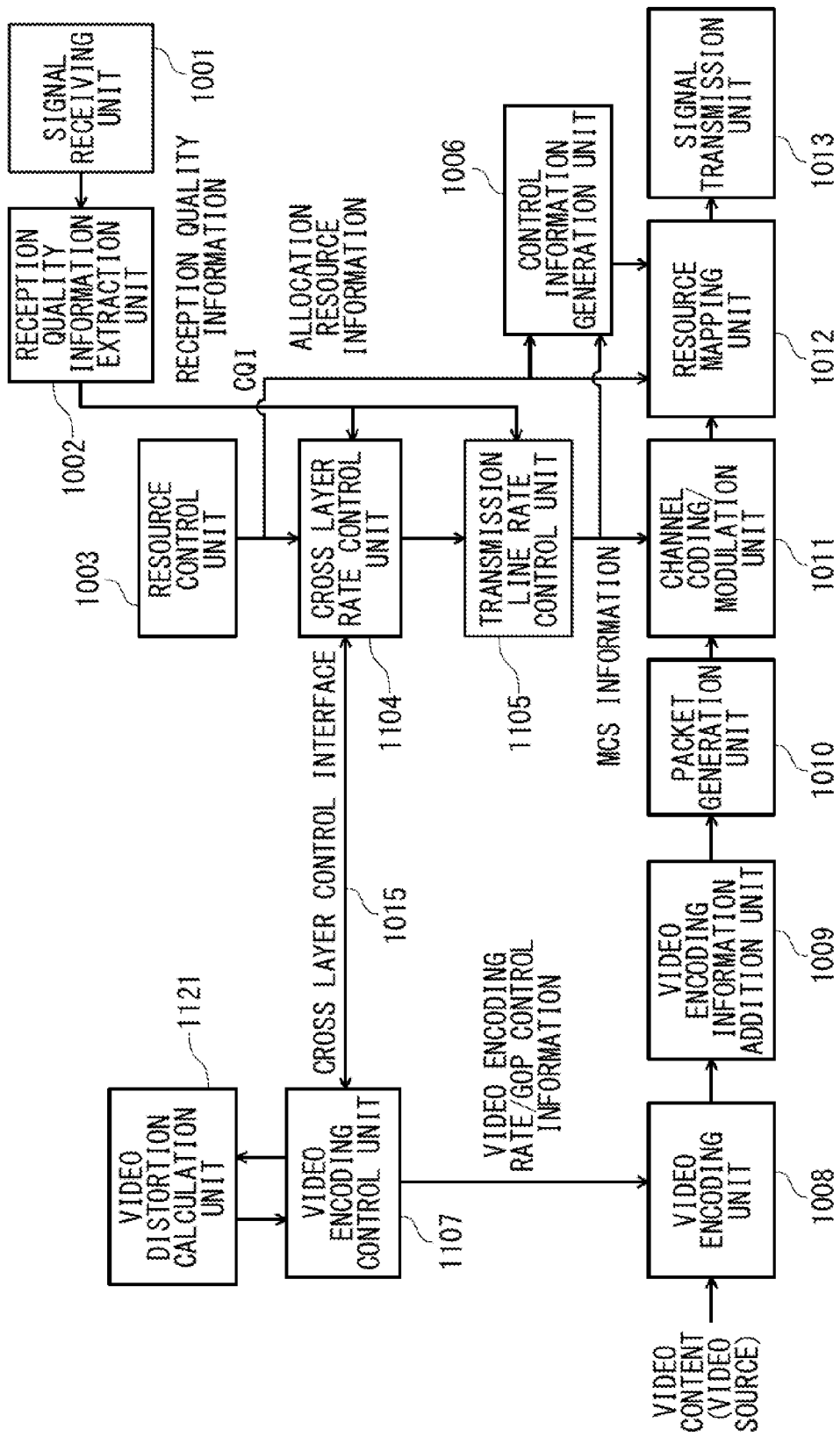
FIG. 15 is a block diagram showing the configuration of a wireless transmission device related to a second modification of the first example.

FIG. 15 is a block diagram showing the configuration of the wireless transmission device related to the second modification of the first example. In this second modification, operations of a cross layer rate control unit 1104, a transmission channel rate control unit 1105, and a video encoding control unit 1107 are different from those in the first example described above, and a video distortion calculation unit 1121 that calculates the video distortion D is further provided. The cross layer rate control unit 1104 outputs to the transmission channel rate control unit 1105 an MCS selection result when the information of the video distortion D caused by video encoding is taken into consideration. The video encoding control unit 1107 performs control of the video encoding process and transmission of the video distortion D information to the cross layer rate control unit 1104 using the video distortion calculated by the video distortion calculation unit 1121.

Figure 16:
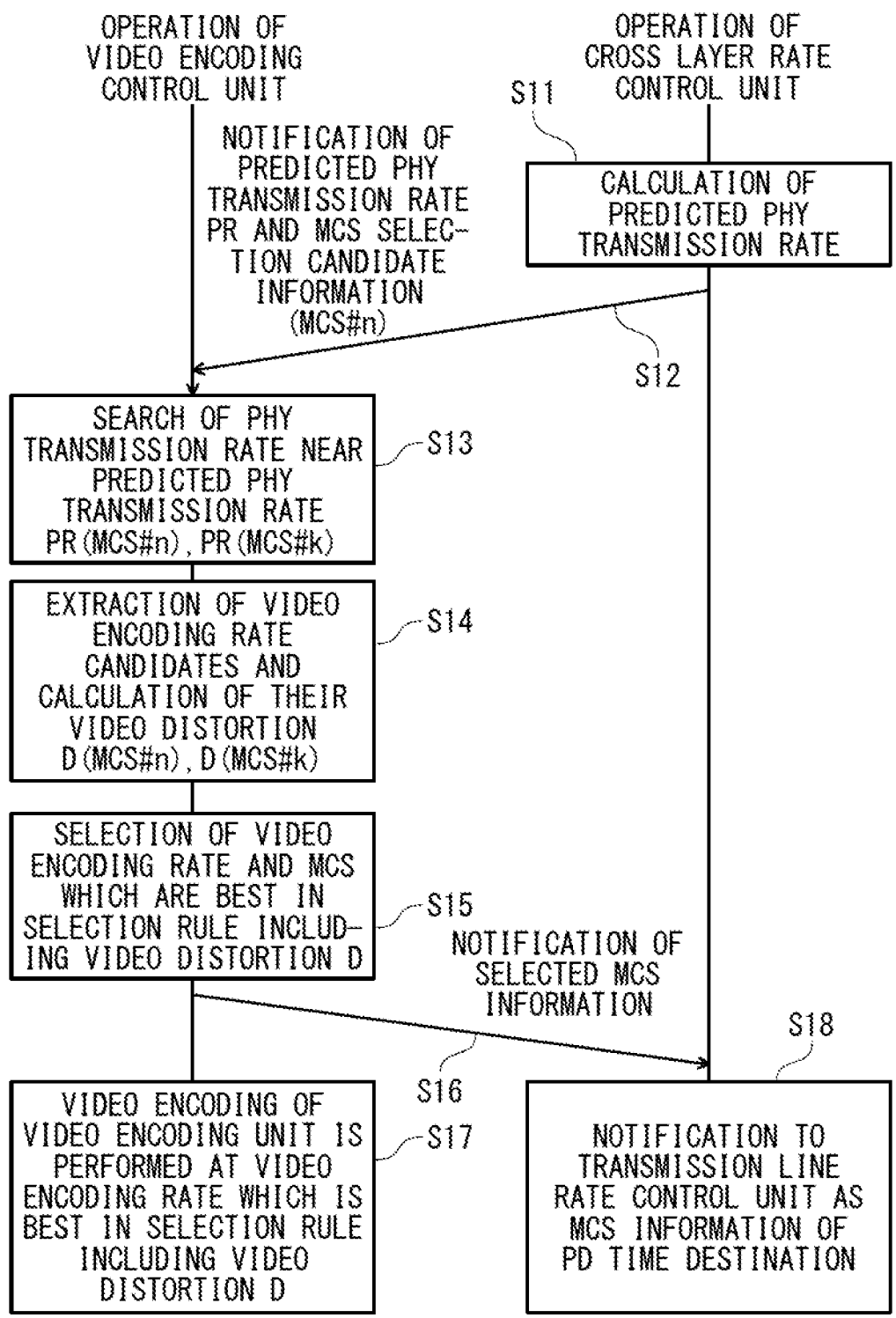
FIG. 16 is a flow chart showing the procedure of determining the video encoding rate and the PHY transmission rate in consideration of the video distortion related to the second modification of the first example.

FIG. 16 is a flow chart showing the procedure of determining the video encoding rate and the PHY transmission rate in consideration of the video distortion related to the second modification of the first example. The cross layer rate control unit 1104 calculates the predicted PHY transmission rate PR in the same manner as the cross layer rate control unit 1004 in the first example shown in FIG. 10 (S11). Then, the cross layer rate control unit 1104 notifies the video encoding control unit 1007 of the calculated (predicted) PHY transmission rate PR and MCS#n used at the time of calculation of the PHY transmission rate PR, as MCS selection candidate information, through the cross layer control interface 1015.

The video encoding control unit 1107 searches for a plurality of MCS#k (here, k=2 or more and approximately 4 or less), which achieves a bit rate equal to the bit rate per modulation symbol (bits/symbol) obtained by the MCS#n or a bit rate in the periphery close to the bit rate per modulation symbol (including a case exceeding the bit rate per modulation symbol and a case less than the bit rate per modulation symbol), with the notified MCS selection candidate information (MCS#n). Then, the PHY transmission rates PR(MCS#n) and PR(MCS#n) when these MCS#n and MCS#k are used are calculated (S13).

Then, the video encoding control unit 1107 selects a quantization size Q, which becomes the last video encoding rate comparable to or less than the calculated PHY transmission rates PR(MCS#n) and PR(MCS#n), and extracts the selected quantization size as video encoding rate candidates. The video distortion calculation unit 1121 receives these video encoding rate candidates, calculates the video distortion D(MCS#n) and D(MCS#k) at the time of each application, and outputs the result to the video encoding control unit 1107 (S14). The video encoding control unit 1107 selects a video encoding rate and an MCS which are the best (which minimizes the video distortion D) according to the selection rule considering the video distortion D (S15).

Here, there are two methods of selecting the MCS which minimizes the video distortion D.

(Method 1) From the calculation values of the video distortion D(MCS#n) and D(MCS#k), the MCS which minimizes the video distortion D is selected from MCS#n and MCS#k.

(Method 2) The calculation values of the video distortion D(MCS#n) and D(MCS#k) are multiplied by weighting coefficients α(MCS#n) and α(MCS#k) considering the packet error rate (PER) in each transmission, and the MCS which becomes a minimum value among them is selected from MCS#n and MCS#k. Here, the weight coefficient when the PER is taken into consideration can be calculated by α(MCS#k)=PER(MCS#k)/Target_PER using PER(MCS#k) when MCS#k is applied in the reception quality (SINR) which achieves the target PER(Target_PER) when the cross layer rate control unit 1104 selects MCS#n as an MCS selection candidate. In this case, α(MCS#n)=PER (MCS#n)/Target_PER=1.

Then, the video encoding control unit 1107 notifies the cross layer rate control unit 1104 of the selection MCS information indicating the selected MCS through the cross layer control interface 1015 (S16). In addition, the video encoding control unit 1107 instructs the video encoding unit 1008 to perform video encoding using the video encoding rate, which is the best when the video distortion D is taken into consideration, by the MCS selected according to the selection rule in the (Method 1) or (Method 2) described above. The video encoding unit 1008 performs video encoding in GOP#n using the video encoding rate designated by the video encoding control unit 1107.

The cross layer rate control unit 1104 notifies the transmission channel rate control unit 1105 of the received selection MCS information as MCS control information indicating the MCS of the PD time destination which predicts the PHY transmission rate. Using the MCS control information from the cross layer rate control unit 1104, the transmission channel rate control unit 1105 selects an MCS when channel coding and modulation are performed by the channel coding/modulation unit 1011.

By the above control operation, it is possible to set the video encoding rate and the PHY transmission rate in consideration of the video distortion D. As a result, it is possible to improve the video reception quality. In addition, although MCS information is exchanged through the cross layer control interface 1015 in the second modification, an MCS table which can be used in the channel coding/modulation unit 1011 may be shared in advance between the video encoding control unit 1107 and the cross layer rate control unit 1104. The MCS table is formed as a list in which index information of MCS is associated with the encoding rate and the modulation scheme (QPSK, 16QAM, 64QAM, and the like) corresponding to the index information. It is preferable to share this MCS table by notification from the cross layer rate control unit 1104 to the video encoding control unit 1107 through the cross layer control interface 1015 at the start of video transmission. In this manner, it is possible to reduce the amount of information which needs to be transmitted in the cross layer control interface 1015. In addition, when the above (Method 2) is used in the selection of the video encoding rate and the MCS which are the best according to the selection rule considering the video distortion D, the weight information α(MCS#k) and the Target_PER information may be written in a table so that they can be shared in advance between the video encoding control unit 1107 and the cross layer rate control unit 1104. It is preferable to share the weight information table by notification from the cross layer rate control unit 1104 to the video encoding control unit 1107 through the cross layer control interface 1015 at the start of video transmission. In this manner, it is possible to reduce the amount of information which is needed in the cross layer control interface 1015.

Third Modification of the First Example

As a third modification of the first example, a second example in which a method of determining the video encoding rate and the PHY transmission rate has been changed is shown. Although the configuration in which the video distortion D for the video encoding rate is calculated each time by the video distortion calculation unit 1121 is adopted in the second modification described above, it is possible to use a table showing their correspondence relationship when the video distortion for the video encoding rate is a fixed value. Accordingly, it becomes unnecessary to calculate the video distortion D each time. As a result, since it is possible to reduce operations regarding the selection of the video encoding rate and the MCS, it is possible to simplify the circuit configuration or to reduce power consumption. In addition, when the video distortion for the video encoding rate is a fixed value as described above, it is possible to apply a procedure for notification of the table information regarding the video distortion D for the video encoding rate from the video encoding control unit 1107 to the cross layer rate control unit 1104 through the cross layer control interface 1015 at the start of communication or during initialization of the device.

Figure 17:
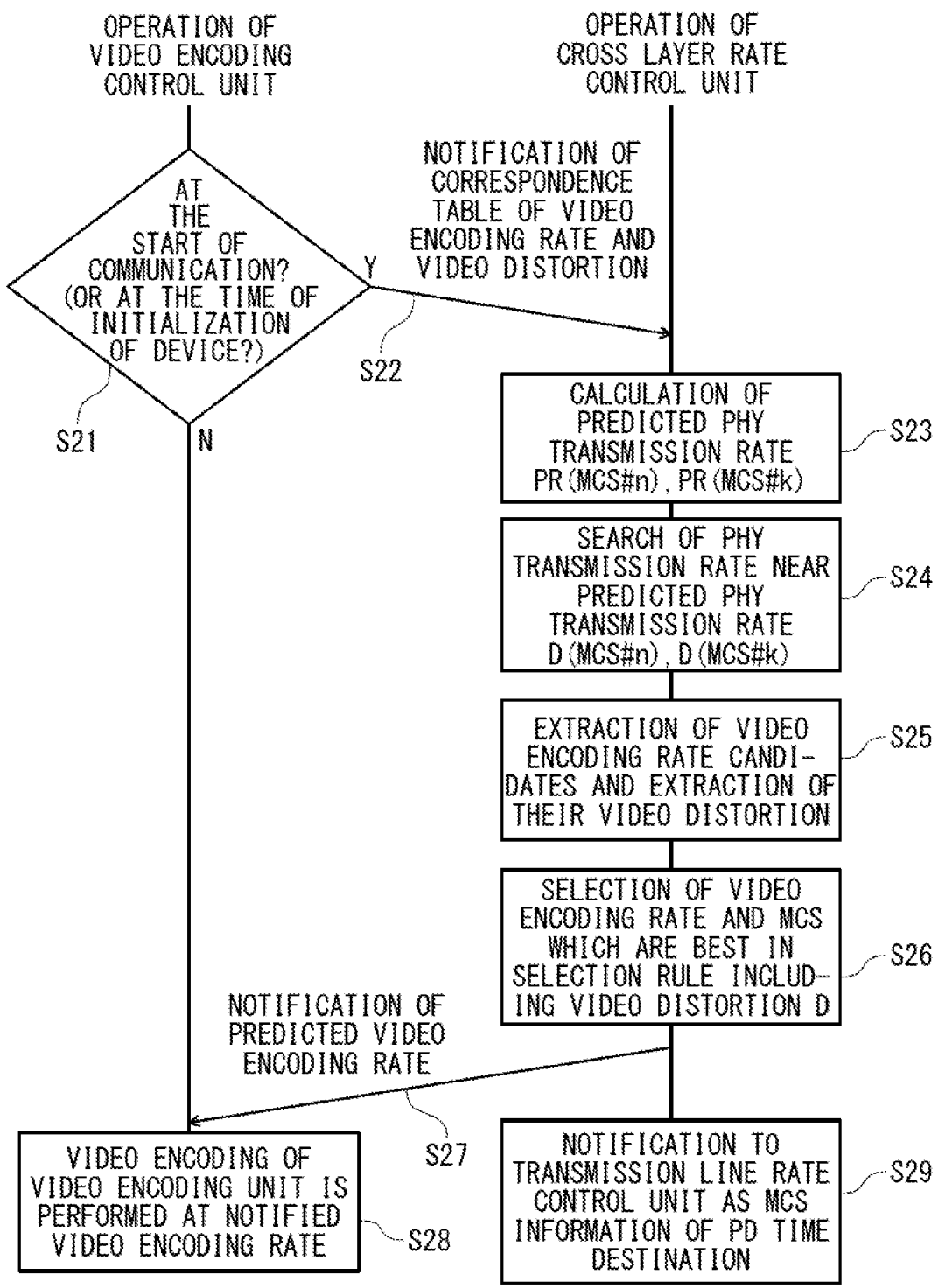
FIG. 17 is a flow chart showing the procedure of determining the video encoding rate and the PHY transmission rate in consideration of the video distortion related to a third modification of the first example.

FIG. 17 is a flow chart showing the procedure of determining the video encoding rate and the PHY transmission rate in consideration of the video distortion related to the third modification of the first example. In the third modification, information of the video encoding rate and video distortion can be checked by the cross layer rate control unit 1104. Accordingly, MCS selection using the selection rule considering the video distortion D is performed by the cross layer rate control unit 1104. The video encoding control unit 1107 determines whether or not it is at the start of communication (or during the initialization of the device) (S21). When it is at the start of communication or during the initialization of the device, the video encoding control unit 1107 notifies the cross layer rate control unit 1104 of the video distortion table, which shows the correspondence information of the video encoding rate and the video distortion, through the cross layer control interface 1015 (S22).

The cross layer rate control unit 1104 calculates the predicted PHY transmission rate PR in the same manner as in the first modification described above (S23). Then, the cross layer rate control unit 1104 searches for a plurality of MCS#k (here, k=2 or more and approximately 4 or less), which achieves a bit rate equal to the bit rate per modulation symbol obtained by the MCS#n or a bit rate in the periphery close to the bit rate per modulation symbol (including a case exceeding the bit rate per modulation symbol and a case less than the bit rate per modulation symbol), with the MCS#n used when calculating the PHY transmission rate PR. Then, the PHY transmission rates PR(MCS#n) and PR(MCS#n) when these MCS#n and MCS#k are used are calculated (S24).

Then, the cross layer rate control unit 1104 selects a video encoding rate corresponding to the last PHY transmission rate, which is comparable to or less than the calculated PHY transmission rates PR(MCS#n) and PR(MCS#n), and extracts the selected video encoding rate as video encoding rate candidates. Then, using the video distortion table, the video distortion D(MCS#n) and D(MCS#k) at the time of application of each video encoding rate candidate are extracted (S25). Then, the cross layer rate control unit 1104 selects a video encoding rate and an MCS which are the best (which minimizes the video distortion D) according to the selection rule considering the video distortion D (S26).

Then, the cross layer rare control unit 1104 notifies the video encoding control unit 1107 of the selection video encoding rate information, which indicates the selected video encoding rate and MCS, through the cross layer control interface 1015 (S27). On the basis of the received selection video encoding rate information, the video encoding control unit 1107 instructs the video encoding unit 1008 to perform video encoding using the video encoding rate at which the video distortion D is minimized by the selected MCS. The video encoding unit 1008 performs video encoding in GOP#n using the video encoding rate designated by the video encoding control unit 1107.

The cross layer rate control unit 1104 notifies the transmission channel rate control unit 1105 of the selected MCS as MCS control information indicating the MCS of the PD time destination which predicts the PHY transmission rate. Using the MCS control information from the cross layer rate control unit 1104, the transmission channel rate control unit 1105 selects an MCS when channel coding and modulation are performed by the channel coding/modulation unit 1011.

By the above control operation, when setting the video encoding rate and the PHY transmission rate in consideration of the video distortion D, it is not necessary to perform control through the cross layer control interface each time. Therefore, it is not necessary to take into consideration the influence of a control delay through the cross layer control interface. Moreover, in this manner, it is possible to shorten the prediction time when calculating the predicted PHY transmission rate.

Fourth Modification of the First Example

As a fourth modification of the first example, a first example in which the operations of the cross layer rate control unit and the video encoding control unit have been changed is shown.

Figure 18:
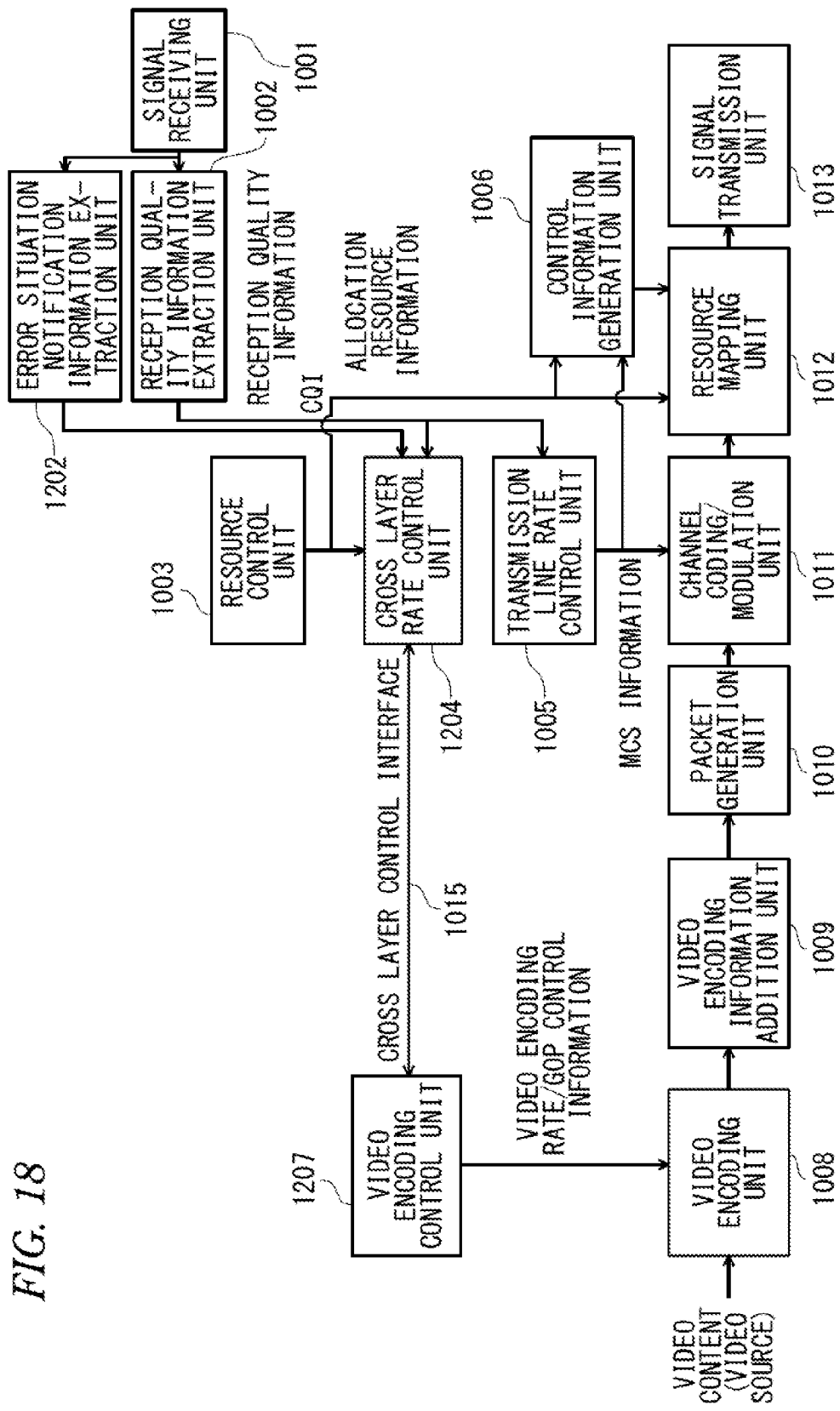
FIG. 18 is a block diagram showing the configuration of a wireless transmission device related to a fourth modification of the first example.

FIG. 18 is a block diagram showing the configuration of the wireless transmission device related to the fourth modification of the first example. In this fourth modification, operations of a cross layer rate control unit 1204 and a video encoding control unit 1107 are different from those in the first example described above, and an error situation notification information extraction unit 1202 that extracts error situation notification information from the video receiving side is further provided. The cross layer rate control unit 1204 and the video encoding control unit 1207 perform variable control of the GOP size in consideration of the error situation notification information output from the error situation notification information extraction unit 1202.

On the basis of the signal received in the signal receiving unit 1001, the error situation notification information extraction unit 1202 extracts error detection information in the packet error detection unit 2007 of the receiving-side wireless communication device, which is transmitted from the wireless communication partner, or error situation notification information notified as the video data loss information in the video data error detection/compensation unit 2009.

The cross layer rate control unit 1204 predicts the transmission rate (PHY transmission rate) of a wireless transmission section on the basis of the allocation resource information and the reception quality information CQI, and notifies the video encoding control unit 1207 of the result through the cross layer control interface 1015. In addition, the cross layer rate control unit 1204 notifies the video encoding control unit 1207 of the error situation notification information extracted by the error situation notification information extraction unit 1202 through the cross layer control interface 1015.

The video encoding control unit 1207 determines parameters, such as the GOP size, the quantization size Q, and the video size when performing video encoding, on the basis of the information of the predicted value of the PHY transmission rate from the cross layer rate control unit 1204 acquired through the cross layer control interface 1015. Then, the video encoding control unit 1007 notifies the video encoding unit 1003 of the determined parameter and performs variable control of the video encoding rate for the video encoding unit 1008. Here, as the quantization size Qt, a quantization size Q which becomes the last video encoding rate comparable to or less than the predicted value of the PHY transmission rate is selected. On the other hand, the GOP size is changed as follows.

When comparing the amount of change in the predicted value of the PHY transmission rate due to propagation changes with a determined amount of change, the video encoding control unit 1207 performs comparison using the determined amount of change V or the value V2, which is smaller than the determined amount of change V by the determined value F, according to the number of packet errors or video data losses, and changes the GOP size according to the comparison result.

Figure 19:
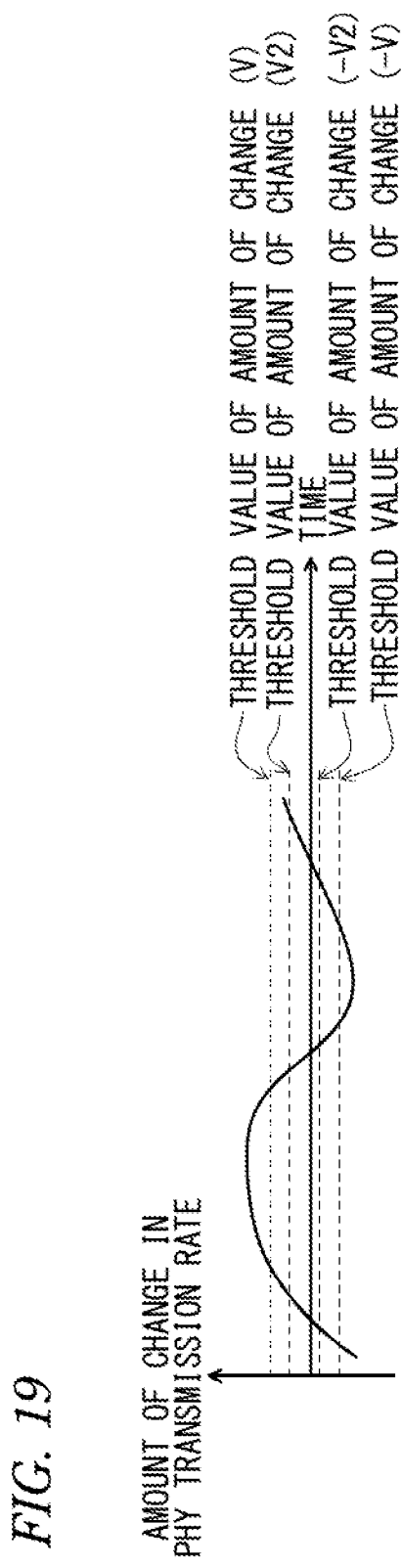
FIG. 19 is a view showing the variable control operation of the GOP size of a video encoding control unit in a fourth modification of the first example.

FIG. 19 is a view showing the variable control operation of the GOP size of the video encoding control unit in the fourth modification of the first example. The video encoding control unit 1207 uses the value V2, which is smaller than the determined amount of change V by F, when the packet error or the video data loss (or the number of block errors of the video encoding unit [for example, a thread unit]) exceeds a determined value TH. Here, the GOP size is changed to the smaller size (GOP size Small: S) when the amount of change in the predicted value of the PHY transmission rate is larger than the determined amount of change V2, and the GOP size is changed to the larger size (GOP size Large: L) when the amount of change in the predicted value of the PHY transmission rate is equal to or less than the determined amount of change V2. Here, F, V, and V2 are positive numbers.

In addition, when the packet error or the video data loss is equal to or less than the determined value TH, the determined amount of change V is used as in the first example described above. That is, the GOP size is changed to the smaller size (S) when the amount of change in the predicted value of the PHY transmission rate is larger than the determined amount of change V, and the GOP size is changed to the larger size (L) when the amount of change in the predicted value of the PHY transmission rate is equal to or less than the determined amount of change V.

Here, the determined value TH used to determine the number of packet errors or video data losses is set such that video distortion falls within the range, which is equal to or less than a determined value, at the time of video decoding on the receiving side. Alternatively, when outer encoding is introduced as error correction coding, the number of packet errors (or the number of block errors) which can be corrected by the outer code is assumed.

By the above control operation, the GOP size can be easily changed before degradation of the video quality becomes noticeable. Therefore, the video reception quality can be improved by increasing followability to propagation changes.

In addition, in the fourth modification described above, on the basis of the information of the predicted value of the PHY transmission rate from the cross layer rate control unit 1204, variable control of the GOP size when performing video encoding is performed by the video encoding control unit 1207. However, the subject of control may be replaced. That is, the same effect may also be obtained in a configuration in which the cross layer rate control unit 1204 determines the GOP size on the basis of the reference value of the PHY transmission rate and the cross layer rate control unit 1204 sends a notification to the video encoding control unit 1207.

Fifth Modification of the First Example

As a fifth modification of the first example, a second example in which the operations of the cross layer rate control unit and the video encoding control unit have been changed is shown. In the fifth modification, the operation in the fourth modification is changed in part. When comparing the amount of change in the predicted value of the PHY transmission rate due to propagation changes with a determined amount of change, the video encoding control unit 1207 performs comparison using the determined amount of change V or the value V3, which is larger than the determined amount of change V by the determined value S, according to the number of packet errors or video data losses, and changes the GOP size according to the comparison result.

Figure 20:
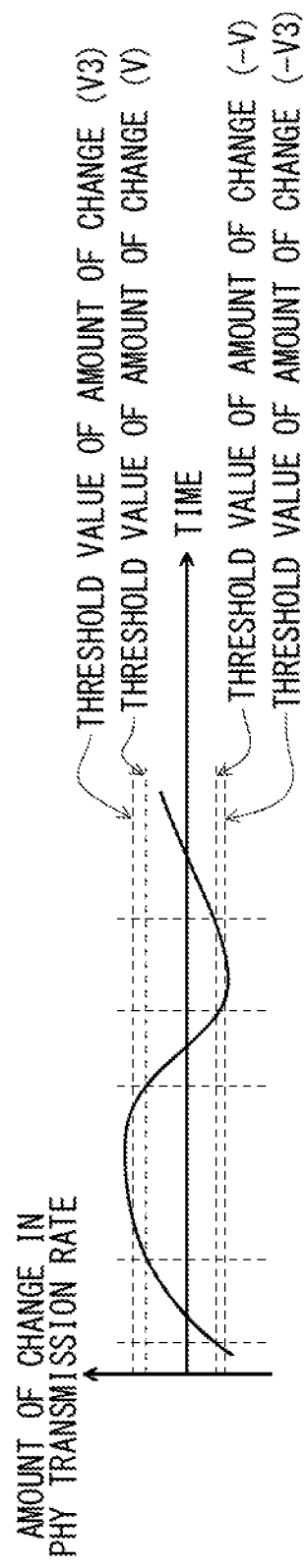
FIG. 20 is a view showing the variable control operation of the GOP size of a video encoding control unit in a fifth modification of the first example.

FIG. 20 is a view showing the variable control operation of the GOP size of the video encoding control unit in the fifth modification of the first example. In addition, when the packet error or the video data loss (or the number of block errors of the video encoding unit [for example, a thread unit]) exceeds the determined value TH, the determined amount of change V is used as in the first example described above. That is, the GOP size is changed to the smaller size (S) when the amount of change in the predicted value of the PHY transmission rate is larger than the determined amount of change V, and the GOP size is changed to the larger size (L) when the amount of change in the predicted value of the PHY transmission rate is equal to or less than the determined amount of change V.

In addition, when the packet error or the video data loss is equal to or less than the determined value TH, the value V3 which is larger than the determined amount of change V by S is used. Here, the GOP size is changed to the smaller size (S) when the amount of change in the predicted value of the PHY transmission rate is larger than the determined amount of change V3, and the GOP size is changed to the larger size (L) when the amount of change in the predicted value of the PHY transmission rate is equal to or less than the determined amount of change V3. Here, S, V, and V3 are positive numbers.

By the above control operation, when the packet error or the video data loss is equal to or less than the determined value, the GOP size is reduced only when the amount of change is a larger level. In this case, if errors on the receiving side are equal to or less than the determined amount, it can be assumed that followability to propagation changes is obtained to some extent and accordingly it is possible to reduce the frequency to reduce the GOP size. For this reason, since the amount of data in the average encoded video data can be reduced (that is, the compression rate can be increased), the resource of a wireless transmission section can be effectively used.

Second Example

A second example corresponds to the second embodiment described above. The configuration of a wireless communication device is the same as that in the first example described above. Here, characteristic operations in the second example will be described on the basis of the configuration of the wireless transmission device shown in FIG. 8.

The video encoding control unit 1007 determines parameters, such as the GOP size, the quantization size Q, and the video size when performing video encoding, on the basis of the information of the predicted value of the PHY transmission rate from the cross layer rate control unit 1004 acquired through the cross layer control interface 1015. Then, the video encoding control unit 1007 notifies the video encoding unit 1003 of the determined parameter and performs variable control of the video encoding rate for the video encoding unit 1008. Here, as the quantization size Q, a quantization size Q which becomes the last video encoding rate comparable to or less than the predicted value of the PHY transmission rate is selected. On the other hand, the GOP size is changed as follows.

The video encoding control unit 1007 compares the amount of change in the predicted value of the PHY transmission rate due to propagation changes with a determined amount of change on the basis of the information regarding the predicted value of the PHY transmission rate from the cross layer rate control unit 1004, and changes the GOP size when the amount of change in the predicted value of the PHY transmission rate due to propagation changes exceeds the determined amount of change. In this case, as shown in FIG. 4, the GOP size is changed to the smaller size (S) when the amount of change in the predicted value of the PHY transmission rate is larger than the determined amount of change, and the GOP size is changed to the normal size (default value) (N) when the amount of change in the predicted value of the PHY transmission rate is equal to or less than the determined amount of change. That is, when the predicted value of the PHY transmission rate is lower than the last transmission rate by a determined value or more and when the predicted value of the PHY transmission rate is higher than the last transmission rate by a determined value or more, the GOP size is changed to Small (S). In addition, when the amount of change in the predicted value of the PHY transmission rate is equal to or less than the determined amount of change, the GOP size may be changed to the larger size (L).

Moreover, in addition to the above-described variable control of the GOP size, the video encoding control unit 1007 may control the video encoding unit 1008 as follows in order to adjust the video encoding resolution. When the amount of change in the predicted value of the PHY transmission rate is larger than a determined amount of change and accordingly the GOP size is changed to a smaller size, a value which is comparable to or less than the predicted value of the PHY transmission rate and which becomes a low video encoding rate compared with a case where the GOP size is normal or large is selected as the quantization size Q. By increasing the quantization size Q in this manner, the spatial resolution is reduced and accordingly the video encoding resolution is reduced. In addition, in order to reduce the video encoding resolution, it is also possible to select a parameter which reduces the frame rate (time resolution). In addition, control to increase the number of I pictures in a GOP may be further performed when reducing the frame rate.

By the above control operation, when the amount of change in the transmission channel parameters is large enough to exceed a determined value, followability to propagation changes is increased by changing the GOP size to Small. In addition, when the smaller GOP size is used, the minimum video quality in a situation where the transmission channel conditions (propagation quality) are poor can be ensured by reducing the video encoding rate or the frame rate. In this manner, it is possible to suppress noticeable degradation of the video quality at the time of low transmission rate. In addition, when reducing the video encoding rate, application of error correction coding based on the lower encoding rate or the selection of an MCS using a modulation scheme with a lower modulation level are possible in the transmission channel rate control unit 1005 if the allocation resource size is fixed. Accordingly, it is possible to suppress quality degradation further.

In addition, although two values of Normal (or Large) and Small are set as the GOP size in the above example, three or more values may also be used without being limited to this. An example of the operation using three values (GOP Large (L)/Normal (N)/Small (S)) is shown below.

The video encoding control unit 1007 compares the amount of change in the predicted value of the PHY transmission rate due to propagation changes with a determined amount of change on the basis of the information regarding the predicted value of the PHY transmission rate from the cross layer rate control unit 1004, and changes the GOP size when the amount of change in the predicted value of the PHY transmission rate due to propagation changes exceeds the determined amount of change. In this case, the GOP size is changed to the smaller size (S) when the amount of change in the predicted value of the PHY transmission rate is larger than the determined amount of change, and the GOP size is changed to the larger size (L) when the amount of change in the predicted value of the PHY transmission rate is equal to or less than the determined amount of change. In addition, when there is no change (when the amount of change is zero), the normal size (N) is used as the GOP size.

Moreover, in addition to the above-described variable control of the GOP size, the video encoding control unit 1007 may adjust the video encoding resolution in the same manner as in the above case of two values. That is, when the GOP size is changed to the smaller size, a value of the quantization size Q is selected such that the video encoding rate (spatial resolution) is smaller than that in the case where the GOP size is normal or large, thereby reducing the video encoding resolution. In addition, in order to reduce the video encoding resolution, it is also possible to select a parameter which reduces the frame rate (time resolution). In addition, control to increase the number of I pictures in a GOP may be further performed when reducing the frame rate.

Third Example

A third example corresponds to the third embodiment described above. The configuration of a wireless communication device is the same as that in the first example described above. Here, characteristic operations in the third example will be described on the basis of the configuration of the wireless transmission device shown in FIG. 8.

The video encoding control unit 1007 determines parameters, such as the GOP size, the quantization size Q, and the video size when performing video encoding, on the basis of the information of the predicted value of the PHY transmission rate from the cross layer rate control unit 1004 acquired through the cross layer control interface 1015. Then, the video encoding control unit 1007 notifies the video encoding unit 1003 of the determined parameter and performs variable control of the video encoding rate for the video encoding unit 1008. Here, as the quantization size Q, a quantization size Q which becomes the last video encoding rate comparable to or less than the predicted value of the PHY transmission rate is selected. On the other hand, regarding the GOP size, the amount of change in the predicted value of the PHY transmission rate due to propagation changes is determined, and the GOP size is changed by the change for the last PHY transmission rate. In this case, as shown in FIG. 5, the GOP size is changed to the smaller size (S) when the predicted value of the PHY transmission rate is lower than the last transmission rate, and the GOP size is changed to the larger size (L) when the predicted value of the PHY transmission rate is higher than the last transmission rate. In addition, when the predicted value of the PHY transmission rate is the same as the last transmission rate, the GOP size is changed to the normal size (default value) (N).

By the above control operation, when the PHY transmission rate is changed to a high rate, an increase in the amount of encoded video data according to an increase in the number of I pictures when the GOP size is changed to Small can be absorbed by increasing the GOP size. Therefore, it is possible to improve the video reception quality under propagation changes while suppressing an increase in the amount of encoded video data.

Fourth Example

A fourth example corresponds to the fourth embodiment described above. The configuration of a wireless communication device is the same as that in the first example described a Here, characteristic operations in the fourth example will be described on the basis of the configuration of the wireless transmission device shown in FIG. 8. In the fourth example, variable control of the GOP size is performed according to the amount of change in the decreasing direction of the predicted value of the PHY transmission rate.

The video encoding control unit 1007 determines parameters, such as the GOP size, the quantization size Q, and the video size when performing video encoding, on the basis of the information of the predicted value of the PHY transmission rate from the cross layer rate control unit 1004 acquired through the cross layer control interface 1015. Then, the video encoding control unit 1007 notifies the video encoding unit 1008 of the determined parameter and performs variable control of the video encoding rate for the video encoding unit 1008. Here, as the quantization size Q, a quantization size Q which becomes the last video encoding rate comparable to or less than the predicted value of the PHY transmission rate is selected. On the other hand, the GOP size is changed as follows.

The video encoding control unit 1007 compares the amount of change in the predicted value of the PHY transmission rate due to propagation changes with a determined amount of change in a decreasing direction on the basis of the information regarding the predicted value of the PHY transmission rate from the cross layer rate control unit 1004, and changes the GOP size when the amount of change in the predicted value of the PHY transmission rate due to propagation changes is the amount of change in the decreasing direction exceeding the determined amount. In this case, the GOP size is changed to the smaller size (S) when the amount of change in the predicted value of the PHY transmission rate is larger than a determined negative (decreasing direction) amount of change (when the amount of reduction of the predicted value of the PHY transmission rate is larger than a determined value), and the GOP size is changed to the larger size (L) when the amount of change in the predicted value of the PHY transmission rate is equal to or less than the determined negative (decreasing direction) amount of change.

In addition, the GOP size may be given as a rate of change in the GOP size instead of switching between the large GOP and the small GOP. In this case, for the standard GOP size (or the GOP size at the start of video transmission), when the amount of change in the predicted value of the PHY transmission rate is larger than a determined negative amount of change, a value obtained by multiplying the GOP size by the rate of change smaller than 1 and rounding off the result to an integral value is used as the GOP size Small (S). On the other hand, when the amount of change in the predicted value of the PHY transmission rate is equal to or less than the determined negative amount of change, a value obtained by multiplying the GOP size by the rate of change larger than 1 and rounding off the result to an integral value is used as the GOP size Large (L). Such control based on the rate of change of the GOP size is suitable for a case of performing video encoding by changing the GOP size according to the video content.

By the above control operation, when the amount of change in the transmission channel parameters is reduced beyond a determined amount, followability to propagation changes can be increased by reducing the GOP size. As a result, it is possible to improve the video reception quality. In addition, since the ratio of the number of I pictures is increased by reducing the GOP size, it is possible to reduce the influence of error propagation to the entire GOP when decoding of I pictures fails. In this manner, it is possible to suppress degradation of the video quality when followability to propagation changes is not sufficient. In addition, when the amount of change in the transmission channel parameters is equal to or less than a determined value, an increase in the amount of encoded video data according to a reduction in the compression rate when the GOP size is reduced can be absorbed by increasing the GOP size. For this reason, it is possible to improve the video reception quality while suppressing an increase in the amount of encoded video data.

In addition, although two values of Large and Small are set as the GOP size in the above example, three or more values may also be used without being limited to this. An example of the operation using three values (GOP Large (L)/Normal (N)/Small (S)) is shown below.

The video encoding control unit 1007 compares the amount of change in the predicted value of the PHY transmission rate due to propagation changes with a determined amount of change in a decreasing direction on the basis of the information regarding the predicted value of the PHY transmission rate from the cross layer rate control unit 1004, and changes the GOP size when the amount of change in the predicted value of the PHY transmission rate due to propagation changes is the amount of change in the decreasing direction exceeding the determined amount. In this case, the GOP size is changed to the smaller size (S) when the amount of change in the predicted value of the PHY transmission rate is larger than a determined negative (decreasing direction) amount of change, and the GOP size is changed to the larger size (L) when the amount of change in the predicted value of the PHY transmission rate is equal to or less than the determined negative (decreasing direction) amount of change. In addition, when there is no change (when the amount of change is zero), the normal size (N) is used as the GOP size.

Modifications of the Fourth Example

As a modification of the fourth example, an example in which the operation of variable control of the GOP size has been changed is shown. In a modification of the fourth example, variable control of the GOP size is performed according to the amount of change in the increasing direction of the predicted value of the PHY transmission rate.

The video encoding control unit 1007 compares the amount of change in the predicted value of the PHY transmission rate due to propagation changes with a determined amount of change in an increasing direction on the basis of the information regarding the predicted value of the PHY transmission rate from the cross layer rate control unit 1004, and changes the GOP size when the amount of change in the predicted value of the PHY transmission rate due to propagation changes is the amount of change in the increasing direction exceeding the determined amount. In this case, the GOP size is changed to the smaller size (S) when the amount of change in the predicted value of the PHY transmission rate is larger than the determined positive (increasing direction) amount of change (when an increase in the predicted value of the PHY transmission rate is larger than a determined value), and the GOP size is changed to the larger size (L) when the amount of change in the predicted value of the PHY transmission rate is equal to or less than the determined positive (increasing direction) amount of change.

By the above control operation, when the amount of change in the transmission channel parameters is increased beyond a determined amount, followability to propagation changes can be increased by reducing the GOP size. As a result, it is possible to improve the video reception quality. In addition, when the amount of change in the transmission channel parameters is equal to or less than a determined value, an increase in the amount of encoded video data according to a reduction in the compression rate when the GOP size is reduced can be absorbed by increasing the GOP size. For this reason, it is possible to improve the video reception quality while suppressing an increase in the amount of encoded video data.

Fifth Example

A fifth example corresponds to the fifth embodiment described above. The configuration of a wireless communication device is the same as that in the first example described above. Here, characteristic operations in the third example will be described on the basis of the configuration of the wireless transmission device shown in FIG. 8.

In addition to the variable control of the GOP size in the third or fourth example, the video encoding control unit 1007 may control the video encoding unit 1008 as follows in order to adjust the video encoding resolution. In this case, as shown in FIG. 6, when the predicted value of the PHY transmission rate is lower than the last transmission rate or when the amount of change in the predicted value of the PHY transmission rate is larger than a determined amount of change in the decreasing direction, the GOP size is changed to Small and the quantization size Q is changed. Here, as the quantization size Q, a value which is comparable to or less than the predicted value of the PHY transmission rate and which becomes a low video encoding rate compared with a case where the GOP size is large is selected. By increasing the quantization size Q in this manner, the spatial resolution is reduced and accordingly the video encoding resolution is reduced. In addition, in order to reduce the video encoding resolution, it is also possible to select a parameter which reduces the frame rate (time resolution). In addition, control to increase the number of I pictures in a GOP may be further performed when reducing the frame rate.

By the above control operation, when the smaller GOP size is used, the minimum video quality in a situation where the transmission channel conditions (propagation quality) are poor can be ensured by reducing the video encoding rate or the frame rate. In this manner, it is possible to suppress noticeable degradation of the video quality at the time of low transmission rate. In addition, when reducing the video encoding rate, application of error correction coding based on the lower encoding rate or the selection of an MCS using a modulation scheme with a lower modulation level are possible in the transmission channel rate control unit 1005 if the allocation resource size is fixed. Accordingly, it is possible to suppress quality degradation further.

Sixth Example

A sixth example corresponds to the sixth embodiment described above. The configuration of a wireless communication device is the same as that in the first example described above. Here, characteristic operations in the sixth example will be described on the basis of the configuration of the wireless transmission device shown in FIG. 8.

In the first example, the cross layer rate control unit 1004 operates to predict the transmission rate (PHY transmission rate) of a wireless transmission section or, the basis of the allocation resource information and the reception quality information CQI and to notify the video encoding control unit 1007 of the result through the cross layer control interface 1015. As a different operation from this, in the sixth example, not the predicted value of the PHY transmission rate but the MCS prediction value are notified to the video encoding control unit 1007 through the cross layer control interface 1015. When the resource assigned by the resource control unit 1003 (reserved allocation, preserved allocation, continuous allocation, and persistent allocation) is fixed, the PHY transmission rate is determined uniquely by the MCS selection since the resource size is fixed. In this case, therefore, the cross layer rate control unit 1004 notifies the video encoding control unit 1007 of the MCS prediction value as a transmission channel parameter of a wireless transmission section.

The video encoding control unit 1007 determines parameters, such as the GOP size, the quantization size Q, and the video size when performing video encoding, on the basis of the information of the MCS prediction value from the cross layer rate control unit 1004 acquired through the cross layer control interface 1015. Then, the video encoding control unit 1007 notifies the video encoding unit 1008 of the determined parameter and performs variable control of the video encoding rate for the video encoding unit 1008. Here, for the GOP size, the MCS prediction value is compared with the last MCS prediction value on the basis of the information of the MCS prediction value according to changes in the MCS prediction value due to propagation changes, and the GOP size is changed according to the size relationship between the MCS prediction value and the last MCS prediction value. In this case, as shown in FIG. 7, when the current MCS prediction value is lower than the last MCS prediction value or lower than the last MCS prediction value beyond a determined amount of change, the GOP size is changed to the smaller size (S). In addition, when the current MCS prediction value is higher than the last MCS prediction value or equal to or lower than a determined amount of change, the GOP size may be changed to the larger size (L). In addition, when the current MCS prediction value is the same as the last MCS prediction value, the GOP size is changed to the normal size (default value) (N). By the above control operation, it is possible to improve the video reception quality under propagation changes while suppressing an increase in the amount of encoded video data, as in the first example.

Seventh Example

The seventh example is an example applied to uplink video transmission in a state where the wireless transmission device is a terminal of the wireless communication system and the wireless receiving device is a base station of the wireless communication system. In this case, the wireless transmission device (terminal) transmits video data on the basis of a resource allocation instruction from the wireless receiving device (base station).

<Configuration and Operation of the Wireless Transmission Device>

Figure 21:
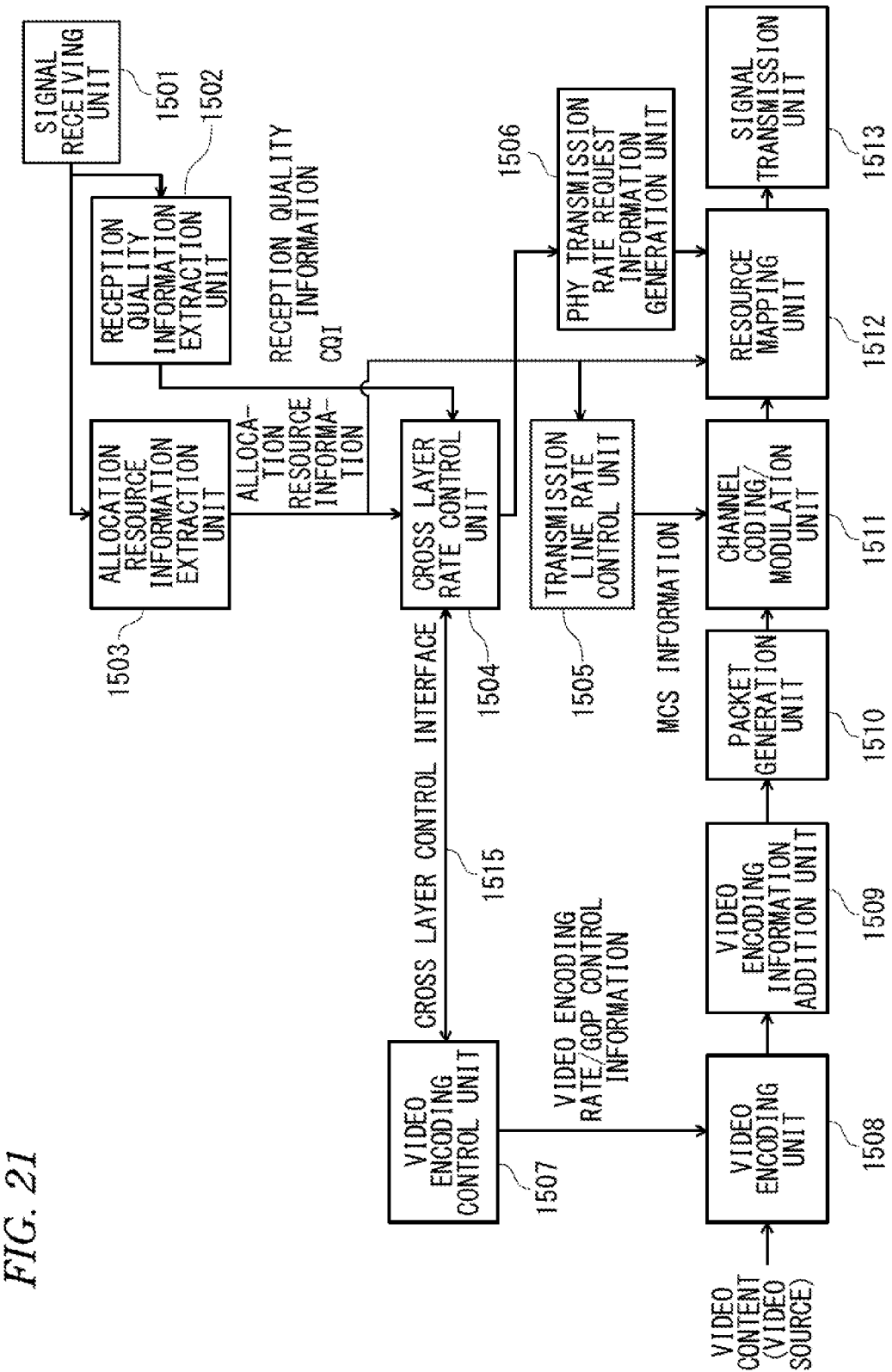
FIG. 21 is a block diagram showing the configuration of a wireless transmission device related to a seventh example.

FIG. 21 is a block diagram showing the configuration of the wireless transmission device related to the seventh example. The wireless transmission device is configured to include a signal receiving unit 1501, a reception quality information extraction unit 1502, an allocation resource information extraction unit 1503, a cross layer rate control unit 1504, a transmission channel rate control unit 1505, a PHY transmission rate request information generation unit 1506, a video encoding control unit 1507, a video encoding unit 1508, a video encoding information addition unit 1509, a packet generation unit 1510, a channel coding/modulation unit 1511, a resource mapping unit 1512, and a signal transmission unit 1513.

The signal receiving unit 1501 receives a wireless signal transmitted from a wireless communication device, which is a partner that performs video transmission through wireless communication, through an antenna and performs frequency conversion of the received signal from the carrier frequency band to the baseband frequency band. The reception quality information extraction unit 1502 extracts CQI, as reception quality information of the wireless transmission channel transmitted from the wireless communication partner, on the basis of the signals received by the signal receiving unit 1501.

The allocation resource information extraction unit 1503 extracts allocation resource information from the control information transmitted from the wireless communication partner on the basis of the signal received by the signal receiving unit 1501. The allocation resource information includes allocation information of the resource at a time and a frequency, which is used for video transmission, among the available wireless resources (frequency carrier band) assigned by the image-transmission-side wireless communication device. In this case, as the allocation resource information, resource position information, resource size information, resource arrangement information (distributed allocation or localized allocation), and the like are included. In addition, the allocation resource information includes MCS information, which is information regarding the encoding rate R and modulation scheme information (QPSK, 16QAM, 64QAM, and the like), in the channel coding/modulation unit 1511 when performing video transmission.

The transmission channel rate control unit 1505 sets the encoding rate R and the modulation scheme information (QPSK, 16QAM, 64QAM, and the like), which are used in the channel coding/modulation unit 1511, according to the MCS information extracted by the allocation resource information extraction unit 1503, and outputs the MCS information to the channel coding/modulation unit 1511.

The video encoding unit 1508 performs video encoding of the video content (video source), which has video data including a moving image or a still image as a source, on the basis of the output of the video encoding control unit 1507. As video encoding, video encoding methods, such as H.264 and MPEG, are used. In the video encoding process, timing of a minimum unit of video encoding rate control is a GOP unit.

The video encoding information addition unit 1509 adds an encoding parameter, which is used at the time of video encoding in the video encoding unit 1508, to the GOP unit as video encoding information. Here, the video encoding information addition unit 1509 adds video encoding information to each header #n of the n-th GOP#n and outputs the result. The packet generation unit 1510 forms a packet based on a predetermined format for the output of the video encoding information addition unit 1509 and outputs the result. In addition, a CRC bit for error detection is added to each packet.

The channel coding/modulation unit 1511 performs channel coding (transmission channel encoding) and modulation for the input packet on the basis of the MCS information (including the encoding rate and the modulation scheme) designated from the transmission channel rate control unit 1505. In this case, the channel coding/modulation unit 1511 generates bit data by performing an error correction coding process with the designated encoding rate R, and also generates symbol data by performing modulation on the basis of the designated modulation scheme (QPSK, 16QAM, 64QAM, and the like).

The resource mapping unit 1512 maps the PHY transmission rate request information on the resource determined in advance, and assigns the output of the channel coding/modulation unit 1503 to the wireless resource at the time and frequency on the basis of the allocation resource information extracted by the allocation resource information extraction unit 1503. Here, when OFDMA is used as secondary modulation, the resource size is set with a resource unit, which includes a predetermined number of subcarriers and a predetermined number of OFDM symbols, as a minimum allocation unit. The signal transmission unit 1513 performs frequency conversion of the output of the resource mapping unit 1512 from the baseband frequency band to the carrier frequency band and outputs the result to the wireless transmission channel through an antenna so that the result is transmitted to the wireless communication device of the communication partner.

The cross layer rate control unit 1504 predicts the transmission rate (PHY transmission rate) of a wireless transmission section on the basis of the allocation resource information and the reception quality information CQI, and notifies the video encoding control unit 1507 of the result through the cross layer control interface 1515. Here, the PHY transmission rate prediction process is performed in the same manner as in the first example shown in FIGS. 10 and 11. That is, in consideration of the processing time PD until the n-th video encoding unit GOP#n encoded and output by the video encoding unit 1508 is transmitted through the wireless transmission channel, the CQI estimate of the PD time destination is calculated from the reception quality situation of a current and a previous time of the reception quality information CQI acquired from the reception quality information extraction unit 1502. Then, an MCS (MCS#n) by which the target packet error rate (PER) is acquired is selected, and the transmission rate in a wireless transmission section is calculated using the allocation resource information. The calculated transmission rate information or the selected MCS information is output to the PHY transmission rate request information generation unit 1506 together with the information of predicted time.

In this manner, the video encoding control unit 1507 can acquire the predicted value of the PRY transmission rate for the GOP#n at the timing before video encoding of the target GOP#n starts. On the basis of the predicted value of the PRY transmission rate, the video encoding control unit 1507 can set parameters of video encoding, such as a GOP size change, a quantization size change, and a frame rate change, according to band changes in the wireless transmission channel (transmission rate change and propagation change).

The video encoding control unit 1507 determines parameters, such as the GOP size, the quantization size Q, and the video size when performing video encoding, on the basis of the information of the predicted value of the PHY transmission rate from the cross layer rate control unit 1504 acquired through the cross layer control interface 1515. Then, the video encoding control unit 1508 notifies the video encoding unit 1508 of the determined parameter and performs variable control of the video encoding rate for the video encoding unit 1008. The operation of the video encoding control unit 1507 is the same as that in each of the first to sixth examples described above, and variable control of the GOP size described in each of the first to sixth examples may be applied. Here, explanation thereof will be omitted.

The PHY transmission rate request information generation unit 1506 generates information including the information of predicted time and the calculated transmission rate information or the selected MCS information, which is output from the cross layer rate control unit 1504, as PHY transmission rate request information based on a predetermined format.

<Configuration and Operation of the Wireless Receiving Device>

Figure 22:
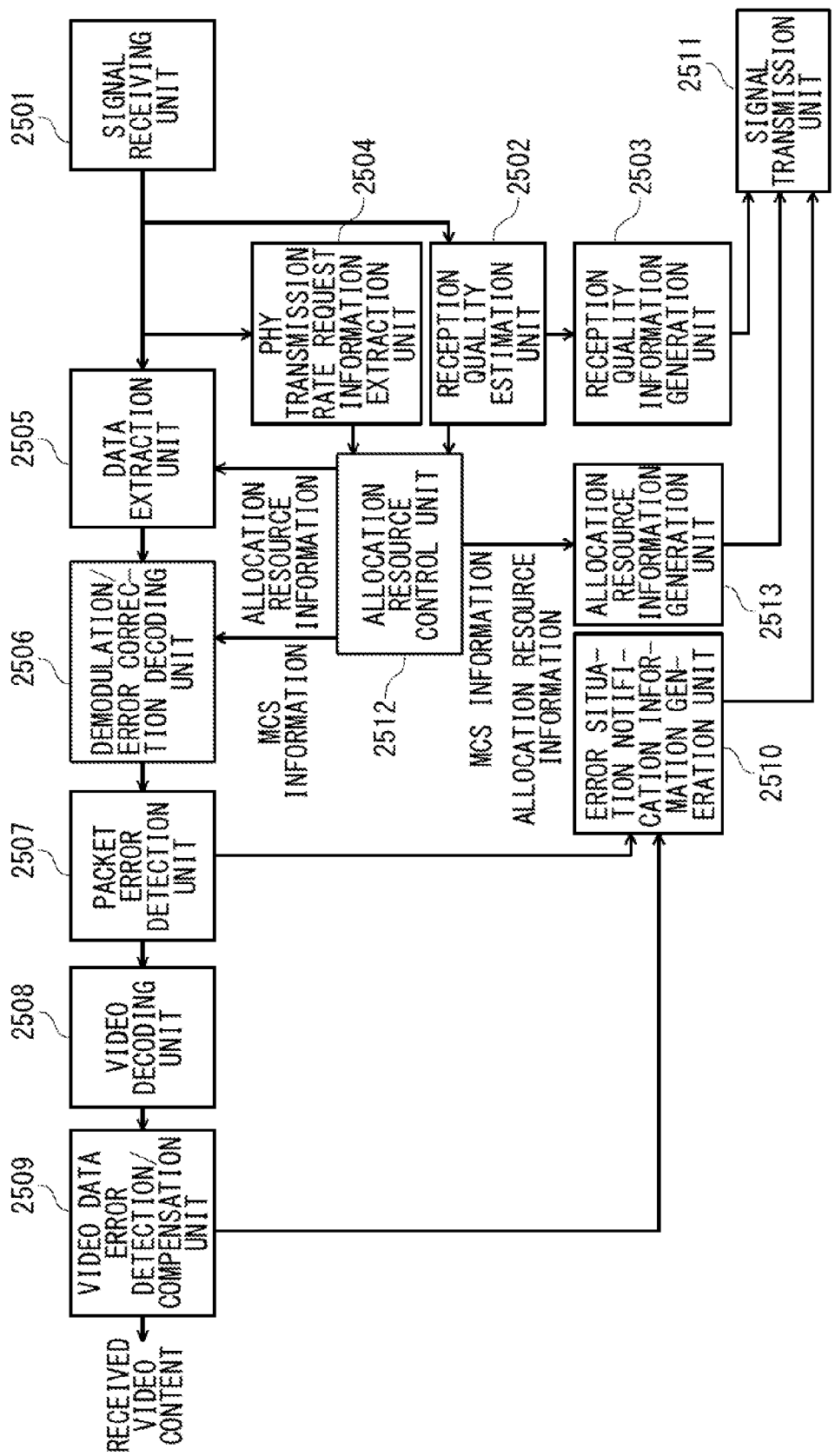
FIG. 22 is a block diagram showing the configuration of a wireless receiving device related to the seventh example.
Figure 23:
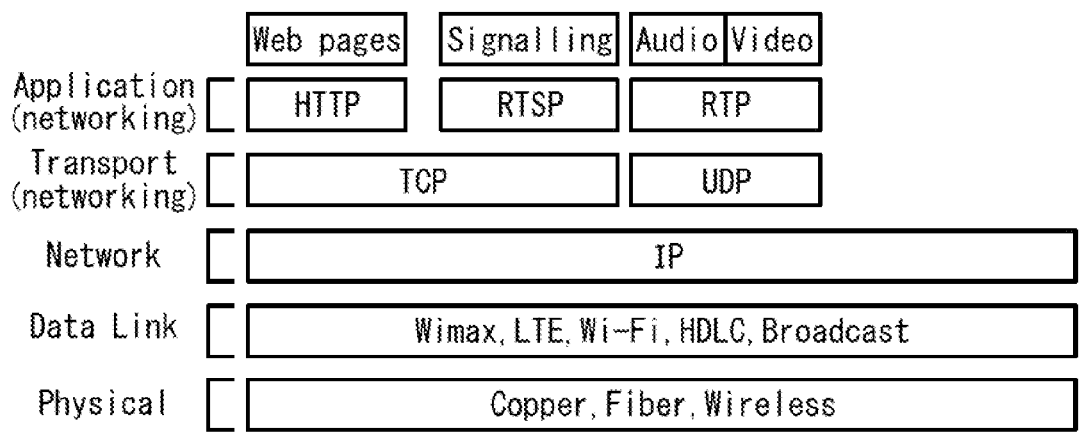
FIG. 23 is a view showing a layer structure at the time of transmission of the multimedia content in the related art.
Figure 24:
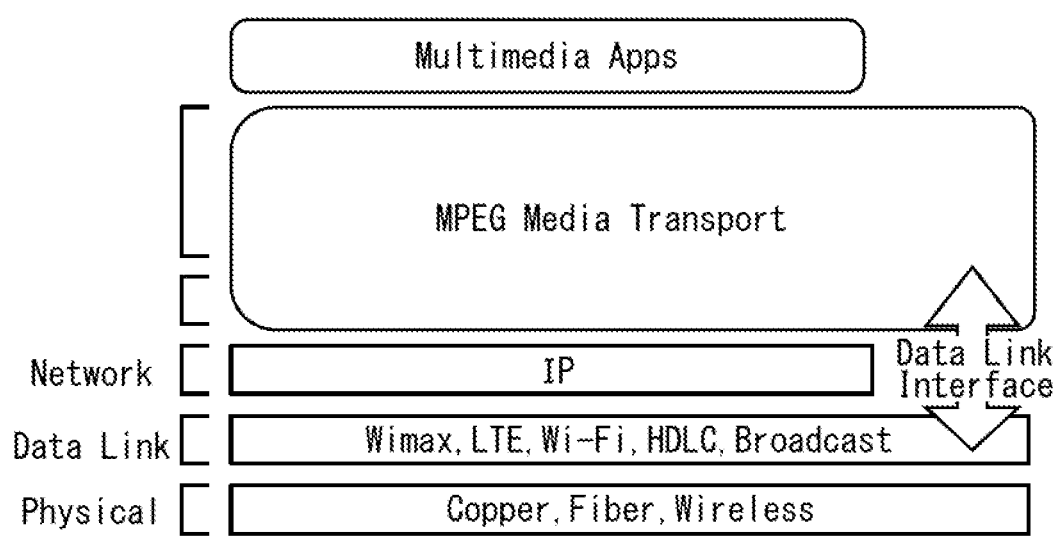
FIG. 24 is a view showing a layer structure at the time of transmission of the multimedia content under investigation in the MPEG.

FIG. 22 is a block diagram showing the configuration of the wireless receiving device related to the seventh example. The wireless receiving device is configured to include a signal receiving unit 2501, a reception quality estimation unit 2502, a reception quality information generation unit 2503, a PHY transmission rate request information extraction unit 2504, a data extraction unit 2505, a demodulation/error correction decoding unit 2506, a packet error detection unit 2507, a video decoding unit 2508, a video data error detection/compensation unit 2509, an error situation notification information generation unit 2510, a signal transmission unit 2511, an allocation resource control unit 2512, and an allocation resource information generation unit 2513.

The signal receiving unit 2501 receives a wireless signal transmitted from the wireless communication device, which is a partner that performs video transmission through wireless communication, through an antenna and performs frequency conversion of the received signal from the carrier frequency band to the baseband frequency band. On the basis of the signal received by the signal receiving unit 2502, the reception quality estimation unit 2501 estimates the reception quality of the wireless transmission channel between the partner device and the host device, for example, using a reception result of a reference signal. The reception quality information generation unit 2503 generates CQI as the reception quality information on the basis of the output of the reception quality estimation unit 2502.

When the signal received by the signal receiving unit 2501 has been subjected to secondary modulation, such as OFDMA, the PHY transmission rate request information extraction unit 2504 performs the demodulation operation to extract the modulated symbolic data in which notification information is included, thereby extracting the PHY transmission rate request information. Here, the PHY transmission rate request information includes transmission rate information or MCS information determined on the transmission side and information of predicted time.

On the basis of the extracted PHY transmission rate request information, the allocation resource control unit 2512 determines the allocation of the resource at a time and a frequency, which is used for video transmission, among the available wireless resources (frequency carrier band). On the basis of the resource allocation information determined by the allocation resource control unit 2512, the allocation resource information generation unit 2513 generates allocation information including allocation resource information, which includes resource position information, resource size information, resource arrangement information, and MCS information, and various kinds of information as control information based on a predetermined format.

When the signal received by the signal receiving unit 2501 has been subjected to secondary modulation, such as OFDMA, the data extraction unit 2505 performs the demodulation operation to extract the modulated symbolic data destined for the host device. The demodulation/error correction decoding unit 2506 converts the extracted symbolic data into channel-coded (transmission-channel-coded) bit data by performing demodulation processing based on the designated modulation scheme (QPSK, 16QAM, 64QAM, and the like) on the extracted symbolic data. In addition, the demodulation/error correction decoding unit 2506 performs an error correction decoding process on the channel-coded bit data.

The packet error detection unit 2507 detects whether or not the packet has been received successfully on the basis of the CRC bit for error detection added to each packet. Then, according to the error detection result, unique index information given to each packet and ACK (reception OK) are output as packet error information to the error situation notification information generation unit 2510 when the packet has been received correctly, and unique index information given to each packet and NACK (reception NG) are output as packet error information to the error situation notification information generation unit 2010 when the packet has not been received correctly.

The video decoding unit 2508 stores primarily the packet received successfully in a buffer, and starts a video decoding process when the data which makes up the smallest unit of video encoding is prepared. Here, when the video content is transmitted in real time, if the data which makes up the smallest unit of video encoding is not prepared in real time, processing for discarding the packet data acquired until then is performed. In the video decoding process, the video decoding unit 2508 decodes the video data according to the encoding parameter set on the transmission side on the basis of the video encoding information included in the packet, thereby reproducing the received video content.

The video data error detection/compensation unit 2509 detects a loss (video data error) of the video data based on a packet which has not been acquired in real time. In addition, when the loss of video data is detected, compensation for the video data is performed. As compensation for video data, for example, video data on the same screen from previously is used again on the basis of the position on the screen (on the field) formed by the video data. As a result, degradation of the video quality can be suppressed. In addition, when the loss of video data is detected at a predetermined frequency or higher, the information is output to the error situation notification information generation unit 2510 as video data loss information.

The error situation notification information generation unit 2510 generates error situation notification information, in a format in which each error can be distinguished, from the packet error information in the packet error detection unit 2507 or the video data loss information in the video data error detection/compensation unit 2509. The signal transmission unit 2511 performs frequency conversion of the allocation resource information, the error situation notification information, and the reception quality information CQI from the baseband frequency band to the carrier frequency band and outputs the result to the wireless transmission channel through an antenna so that the result is transmitted to the wireless communication device of the communication partner.

By the above configuration and operation, also in the uplink from the terminal of the wireless communication system to the base station, similar to the downlink from the base station of the wireless communication system to the terminal shown in the first to sixth examples, the parameter update interval in the video encoding control unit 1507 can be changed on the basis of the video encoding timing of the GOP unit in the video encoding unit 1508, and a change in the PHY transmission rate (transmission band width) and the GOP size can be controlled so as to be associated with each other. That is, the GOP size can be changed according to the situation of changes in the PHY transmission rate (propagation change). In this manner, it is possible to improve the video reception quality under propagation changes.

In addition, various changes and applications of the present invention may be made by those skilled in the art on the basis of the description of this specification and known techniques without departing from the spirit and scope of the present invention, and these are also included in the range of the request for protection. In addition, the respective components in the embodiments described above may be arbitrarily combined without departing from the scope of the invention.

Moreover, although the case of the configuration where the present invention is realized by hardware has been described as an example in the above embodiments, the present invention may also be realized by software.

Each functional block used to describe the embodiment and each modification is typically implemented by an LSI, which is an integrated circuit. Each functional block may be integrated into one chip, or a portion of or the entire functional block may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional blocks. For example, biotechnology can be applied.

This application is based on Japanese Patent Application (Japanese Patent Application No. 2010-086226) filed on Apr. 2, 2010, the disclosure of which is incorporated herein by reference in its entirety.

INDUSTRIAL APPLICABILITY

The present invention has the effect that it is possible to improve the video quality on the receiving side further when controlling the transmission channel parameters and the video encoding parameters so as to be linked to each other in video transmission. For example, the present invention may be applied to a communication device and the like which perform cross layer optimization, and is useful as a wireless communication device, a wireless communication method, and the like which perform video transmission using wireless transmission.

REFERENCE SIGNS LIST

301: video encoding unit
302: channel coding/modulation unit
303: signal transmission unit
304: cross layer rate control unit
1001: signal receiving unit
1002: reception quality information extraction unit
1003: resource control unit
1004, 1104, 1204: cross layer rate control unit
1005, 1105: transmission channel rate control unit
1006: control information generation unit
1007, 1107, 1207: video encoding control unit
1008: video encoding unit
1009: video encoding information addition unit
1010: packet generation unit
1011: channel coding/modulation unit
1012: resource mapping unit
1013: signal transmission unit
1015: cross layer control interface
1021, 1031: CQI information storage section
1022, 1032: predicted PHY transmission rate calculation section
1033: predicted PHY transmission rate storage section
1034: variation determination section
1121: video distortion calculation unit
1202: error situation notification information extraction unit
1501: signal receiving unit
1502: reception quality information extraction unit
1503: allocation resource information extraction unit
1504: cross layer rate control unit
1505: transmission channel rate control unit
1506: PHY transmission rate request information generation unit
1507: video encoding control unit
1508: video encoding unit
1509: video encoding information addition unit
1510: packet generation unit
1511: channel coding/modulation unit
1512: resource mapping unit
1513: signal transmission unit
1515: cross layer control interface
2001: signal receiving unit
2002: reception quality estimation unit
2003: reception quality information generation unit
2004: control information extraction unit
2005: data extraction unit
2006: demodulation/error correction decoding unit
2007: packet error detection unit
2008: video decoding unit
2009: video data error detect ion/compensation unit
2010: error situation notification information generation unit
2011: signal transmission unit
2501: signal receiving unit
2502: reception quality estimation unit
2503: reception quality information generation unit
2504: PHY transmission rate request information extraction unit
2505: data extraction unit
2506: demodulation/error correction decoding unit
2507: packet error detection unit
2508: video decoding unit
2509: video data error detection/compensation unit
2510: error situation notification information generation unit
2511: signal transmission unit
2512: allocation resource control unit
2513: allocation resource information generation unit

The invention claimed is:

1. A wireless communication device comprising:
a video encoding unit configured to perform video encoding on video data to generate an encoded video data;
a channel coding and modulation unit configured to perform error correction coding and modulation on the encoded video data to generate channel coded video data;
a signal transmission unit configured to transmit the channel coded video data; and
a control unit configured to perform variable control of a GOP (Group of Pictures) size in the video encoding on the basis of the amount of change in a transmission channel parameter corresponding to a predicted value of a transmission rate on a transmission channel through which the channel coded video data is transmitted,
wherein the GOP size is controlled so as to become smaller than a determined size when the amount of change in the transmission channel parameter is larger than a determined amount of change.

2. The wireless communication device according to claim 1,
wherein the GOP size is controlled so as to become larger than the determined size when the amount of change in the transmission channel parameter is equal to or less than the determined amount of change.

3. The wireless communication device according to claim 1,
wherein the GOP size is controlled so as to become smaller than a determined size when the amount of change in the transmission channel parameter with respect to a last transmission channel parameter is larger than a determined amount of change, and the GOP size is controlled so as to become equal to or larger than the determined size when the amount of change in the transmission channel parameter with respect to the last transmission channel parameter is equal to or less than the determined amount of change.

4. The wireless communication device according to claim 1,
   wherein the GOP size is controlled so as to become smaller than a determined size when the amount of change in the transmission channel parameter with respect to a last transmission channel parameter changes to exceed a determined value, the GOP size is controlled so as to become larger than the determined size when the amount of change in the transmission channel parameter with respect to the last transmission channel parameter changes to become less than the determined value, and the GOP size is controlled so as to become a normal size when the amount of change in the transmission channel parameter with respect to the last transmission channel parameter is equal to or less than a determined amount of change.

5. The wireless communication device according to claim 4,
   wherein, when the GOP size is controlled so as to become larger than the determined size or controlled so as to become smaller than the determined size, the control unit reduces a video encoding rate or a frame rate in the video encoding.

6. The wireless communication device according to claim 1,
   wherein the GOP size is controlled so as to become smaller than a determined size when the amount of change in the transmission channel parameter is larger than a determined amount of change and changes in a decreasing direction, and the GOP size is controlled so as to become larger than the determined size when the amount of change in the transmission channel parameter is equal to or less than the determined amount of change and changes in the increasing direction.

7. A wireless communication method of a wireless communication device which performs transmission of video data, the method comprising:
   performing video encoding on the video data to generate an encoded video data;
   performing error correction coding and modulation on the encoded video data to generate channel coded video data;
   transmitting channel coded video data; and
   performing variable control of a GOP (Group of Pictures) size in the video encoding on the basis of the amount of change in a transmission channel parameter corresponding to a predicted value of a transmission rate on a transmission channel through which the channel coded video data is transmitted,
   wherein the GOP size is controlled so as to become smaller than a determined size when the amount of change in the transmission channel parameter is larger than a determined amount of change.

* * * * *